United States Patent
Yanagisawa et al.

(10) Patent No.: US 7,018,601 B2
(45) Date of Patent: Mar. 28, 2006

(54) CARBON FIBER PRODUCT, AND METHOD OF ADJUSTING LENGTH OF CARBON FIBER PRODUCT

(75) Inventors: Takashi Yanagisawa, Tokyo (JP); Morinobu Endo, 615, Kitahara-cho, Suzaka-shi, Nagano-ken (JP)

(73) Assignees: GSI Creos Corporation, Tokyo (JP); Morinobu Endo, Suzaka (JP)

( * ) Notice: Subject to any disclaimer, the term of this patent is extended or adjusted under 35 U.S.C. 154(b) by 0 days.

(21) Appl. No.: 10/098,461

(22) Filed: Mar. 18, 2002

(65) Prior Publication Data

US 2002/0136882 A1    Sep. 26, 2002

(30) Foreign Application Priority Data

Mar. 21, 2001 (JP) ............................ 2001-081741
Aug. 29, 2001 (JP) ............................ 2001-260417
Feb. 22, 2002 (JP) ............................ 2002-046908

(51) Int. Cl.
*D01F 9/12* (2006.01)

(52) U.S. Cl. ............... 423/447.1; 423/447.2; 423/447.3; 423/460; 428/367

(58) Field of Classification Search ............ 423/447.1, 423/447.2, 447.3, 445 R, 460, 461
See application file for complete search history.

(56) References Cited

U.S. PATENT DOCUMENTS

| | | | | |
|---|---|---|---|---|
| 5,409,775 | A | * | 4/1995 | Harada et al. ............... 428/367 |
| 5,780,101 | A | * | 7/1998 | Nolan et al. ................. 427/216 |
| 6,103,373 | A | * | 8/2000 | Nishimura et al. ......... 428/368 |
| 6,506,355 | B1 | * | 1/2003 | Glasgow et al. ......... 423/447.3 |
| 2003/0004058 | A1 | * | 1/2003 | Li et al. ..................... 502/258 |

FOREIGN PATENT DOCUMENTS

| | | |
|---|---|---|
| EP | 0198 558 A2 | 10/1986 |
| EP | 1 122 344 A2 | 8/2001 |
| WO | WO 91/01621 A2 | 2/1991 |

OTHER PUBLICATIONS

U.S. Appl. No. 10/098,375, Mar. 18, 2002, Yanagisawa et al.
U.S. Appl. No. 10/098,416, Mar. 18, 2002, Yanagisawa et al.
U.S. Appl. No. 10/098,351, Mar. 18, 2002, Yanagisawa et al.
U.S. Appl. No. 10/098,396, Mar. 18, 2002, Yanagisawa et al.

(Continued)

*Primary Examiner*—Tom Dunn
*Assistant Examiner*—Peter J. Lish
(74) *Attorney, Agent, or Firm*—Oliff & Berridge, PLC

(57) ABSTRACT

A carbon fiber product according to the present invention is a carbon fiber product in which one to several hundreds of hexagonal carbon layers in the shape of a bottomless cup are stacked. Edges of the hexagonal carbon layers are exposed on at least part of an outer surface or inner surface. The exposed part of the edges of the hexagonal carbon layers have a high degree of activity and excel in adhesion to base materials such as resins. Therefore, this carbon fiber product is suitable as a material for composites.

2 Claims, 25 Drawing Sheets

OTHER PUBLICATIONS

U.S. Appl. No. 10/098,440, Mar. 18, 2002, Yanagisawa et al.
U.S. Appl. No. 10/098,103, Mar. 18, 2002, Yanagisawa et al.
U.S. Appl. No. 10/098,522, Mar. 18, 2002, Yanagisawa et al.
U.S. Appl. No. 10/098,379, Mar. 18, 2002, Yanagisawa et al.
U.S. Appl. No. 10/098,312, Mar. 18, 2002, Yanagisawa et al.
U.S. Appl. No. 10/098,570, Mar. 18, 2002, Yanagisawa et al.
Endo et al., "Structural characterization of cup-stacked-type nanofibers with an entirely hollow core", Applied Physics Letters, vol. 80, No. 7, Feb. 18, 2002, pp. 1267-1269.
Kim et al., "Effect of ball milling on morphology of cup-stacked carbon nanotubes", Chemical Physics Letters, Apr. 2, 2002.
H. Terrones et al. "Graphitic Cones in Palladium Catalysed Carbon Manofibres", Chemical Physics Letters, vol. 343, pp. 241-250, 2001.
Morinobu Endo et al., "Pyrolytic Carbon Naotubes From Vapor-Grown Carbon Fibers", vol. 33, No. 7, pp. 873-881, 1995.

* cited by examiner 12    10

CARBON FIBER PRODUCT, AND METHOD OF ADJUSTING LENGTH OF CARBON FIBER PRODUCT

Japanese Patent Application No. 2001-81741 filed on Mar. 21, 2001, Japanese Patent Application No. 2001-260417 filed on Aug. 29, 2001, and Japanese Patent Application No. 2002-46908 filed on Feb. 22, 2002, are hereby incorporated by reference in their entirety.

BACKGROUND OF THE INVENTION

The present invention relates to a carbon fiber product, a composite using the same, a conductive resin, and a method of adjusting the length of the carbon fiber product.

A vapor-grown carbon fiber is known in the art.

This carbon fiber is a short fiber in which carbon obtained by pyrolysis of hydrocarbons such as benzene or methane at a temperature of about 700° C. to 1000° C. is grown with a catalyst particle such as a ultra-fine iron particle or nickel as a nucleus.

Carbon fibers generally have a structure in which the hexagonal carbon layers are grown concentrically or a structure in which the hexagonal carbon layers are grown in the axial direction. However, depending upon the vapor growth conditions such as catalyst, temperature range, and flow rate, carbon fibers may have a herring-bone structure in which the stacked hexagonal carbon layers are tilted with respect to the fiber axis at an specific angle.

Carbon fibers are often mixed with resins or the like and used as composites. However, carbon fibers generally have poor adhesion to resins.

This is because carbon fibers have a lower degree of surface activity since the hexagonal carbon layers (AB planes) are exposed on the inner and outer surfaces. Moreover, a thin deposited layer in which an excess amount of insufficiently crystallized amorphous carbon is deposited is inevitably formed on the surface of carbon fibers manufactured using a vapor growth process. This deposited layer also has a lower degree of activity, thereby resulting in poor adhesion to the resins.

BRIEF SUMMARY OF THE INVENTION

The present invention has been achieved to solve the above-described problems. The present invention may provide a carbon fiber product having a high degree of edge and surface activity and exhibiting good adhesion to resins or the like, various types of composites using the same, and a method of adjusting the length of the carbon fiber product.

In order to solve the above problems, a first aspect of the present invention provides a carbon fiber product comprising a coaxial stacking morphology of truncated conical tubular graphene layers, wherein the coaxial stacking morphology of the truncated conical tubular graphene layers includes one to several hundreds of stacked hexagonal carbon layers.

In other words, this carbon fiber product has a cup-stacked structure or a lampshade-stacked structure in which one to several hundreds of hexagonal carbon layers in the shape of a bottomless cup are stacked. The coaxial stacking morphology of the truncated conical tubular graphene layers may have a shape of a hollow core with no bridge. According to such a structure, each of the truncated conical tubular graphene layers has a large ring end at one end and a small ring end at the other end in an axial direction, wherein edges of the hexagonal carbon layers are exposed at the large ring ends of the outer surface and the small ring ends of the inner surface. In other words, the edges of the tilted hexagonal carbon layers having a herring-bone structure are exposed in layers.

If the coaxial stacking morphology of the truncated conical tubular graphene layers is vapor grown, a wide area of an outer surface or an inner surface may be covered with a deposited film of an excess amount of pyrolytic carbons. However, at least part of edges of the hexagonal carbon layers may be exposed at the large ring ends on the outer surface side or at the small ring ends on the inner surface side.

The edges of the hexagonal carbon layers exposed on the outer surface or the inner surface of the carbon fiber product have an extremely high degree of activity, exhibit good affinity to various types of materials, and excel in adhesion to base materials such as resins. Therefore, a composite excelling in tensile strength and compressive strength can be obtained.

Since one to several hundreds of bottomless cup-shaped, specifically, truncated conical tubular hexagonal carbon layers are stacked, the carbon fiber product has a low molecular weight. Therefore, the carbon fiber product can dissolved in various types of solvents by chemically modifying the exposed part of the edges with appropriate functional groups.

According to the first aspect of the present invention, part or all of the deposited films formed over the outer surface or the inner surface during the vapor growth process of the carbon fiber from which the carbon fiber product is formed may be removed by a treatment to be performed later. Since the deposited layers are formed of an excess amount of insufficiently crystallized amorphous carbon, the surfaces of the deposited layers are inactive.

In the carbon fiber product according to the first aspect of the present invention, an outer surface of the carbon fiber product may be formed of the large ring ends stacked in the axial direction; and exposed part of the edges of the hexagonal carbon layers may have an area equal to or more than 2% of an area of the outer surface, and preferably 7% of an area of the outer surface.

The positions of the large ring ends forming the outer surface may be irregular, and the outer surface may have minute irregularity at the level of atoms.

Similarly, an inner surface of the carbon fiber product may be formed of the small ring ends stacked in the axial direction; and positions of the small ring ends forming the inner surface may be irregular, and the inner surface may have minute irregularity at the level of atoms.

Such configuration including a hollow shape provides the anchor effect on the base materials such as resin, and so adhesion to the base materials is further increased. As a result, a composite having an extremely high strength can be provided.

Since the carbon fiber product is in the shape of a minute particle in which one to several hundreds of hexagonal carbon layers in the shape of a bottomless cup are stacked, the carbon fiber product has good dispersibility in resins or metals. As a result, various types of composites excelling in strength and ink exhibiting good coloring characteristics can be provided.

The carbon fiber product according to the first aspect of the present invention may have characteristics by which at least the area in which the edges of the hexagonal carbon layers are exposed (or area in which the deposited layers are removed) is not graphitized even if the carbon fiber is subjected to a heat treatment at a temperature of 2500° C. or more.

Carbon fibers are generally graphitized by a heat treatment at a temperature of 2500° C. or more.

However, the carbon fiber in which the edges of the hexagonal carbon layers are exposed is not graphitized even if the carbon fiber is heated at 2500° C. or more at least in the area in which the edges of the hexagonal carbon layers are exposed.

It is confirmed that the carbon fiber is not graphitized by a heat treatment at a temperature of 2500° C. or more by the fact that the D peak (1360 cm$^{-1}$) in the Raman spectrum does not disappear.

Since the exposed portion of the edges of the hexagonal carbon layers has an extremely high degree of activity, various types of catalytic metal can be supported thereon.

A second aspect of the present invention provides a composite including a base material such as resin (including a resin film) or metal with which the above carbon fiber is mixed in.

A third aspect of the present invention provides a method of adjusting the length of a carbon fiber product comprising:

a step of providing a carbon fiber comprising a coaxial stacking morphology of truncated conical tubular graphene layers, wherein each of the truncated conical tubular graphene layers includes a hexagonal carbon layer, and a step of dividing the carbon fiber between the hexagonal carbon layers by grinding, so as to obtain a carbon fiber product having a length in which one to several hundreds of hexagonal carbon layers are stacked. The carbon fiber may be ground by ball milling.

DETAILED DESCRIPTION OF THE EMBODIMENT

One embodiment of the present invention is described below in detail with reference to the drawings.

A vapor grown carbon fiber according to the present invention has a structure in which one to several hundreds of hexagonal carbon layers in the shape of a bottomless cup are stacked (hereinafter called "carbon fiber having a herring-bone structure").

Carbon fibers generally have a structure in which the hexagonal carbon layers are grown concentrically or a structure in which the hexagonal carbon layers are grown in the axial direction. However, depending upon the vapor growth conditions such as catalyst, temperature range, and flow rate, carbon fibers may have a herring-bone structure in which the stacked hexagonal carbon layers are tilted with respect to the fiber axis at an specific angle.

In an ordinary carbon fiber with a herring-bone structure, a number of hexagonal carbon layers in the shape of a cup having a bottom are stacked. However, the vapor-grown carbon fiber according to one embodiment of the present invention has a structure in which a number of hexagonal carbon layers in the shape of a bottomless cup are stacked (this bottomless carbon fiber is hereinafter called "carbon fiber having a herring-bone structure").

Figure 25:
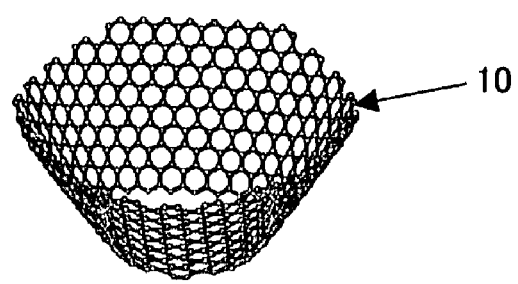
FIG. 25 is a computer graphic showing a hexagonal carbon layer, which is a unit of the coaxial stacking morphology of the truncated conical tubular graphene layers of FIG. 24, based on rigorous quantum theoretical calculation.
Figure 24:
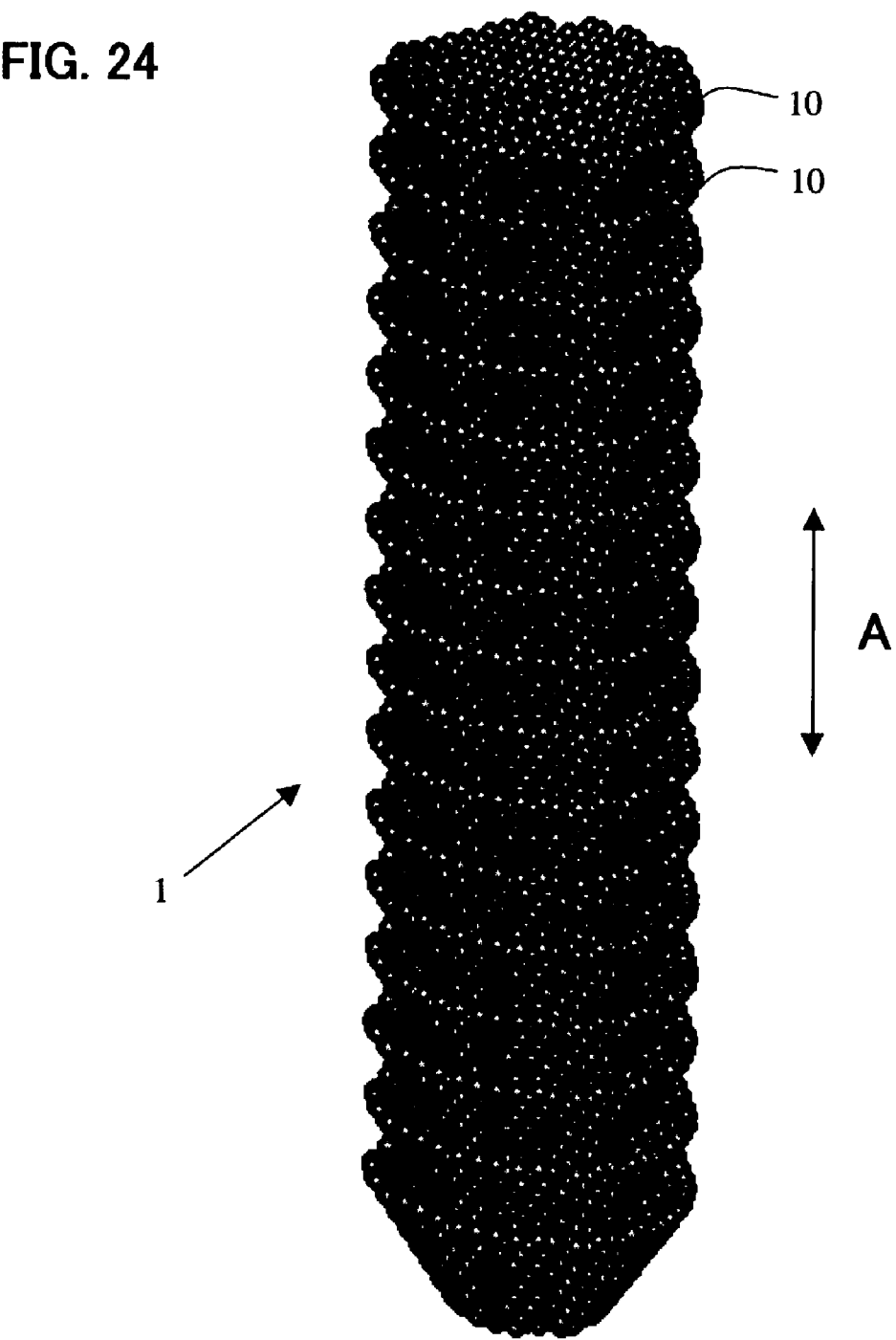
FIG. 24 is a computer graphic showing a coaxial stacking morphology of truncated conical tubular graphene layers, based on rigorous quantum theoretical calculations.

Specifically, this carbon fiber 1 has a coaxial stacking morphology of truncated conical tubular graphene layers shown by a computer graphic in FIG. 24. Each of the truncated conical tubular graphene layers is formed of a hexagonal carbon layer 10 as shown in FIG. 25. Although the actual hexagonal carbon layers are stacked densely in an axial direction A, they are stacked roughly in FIG. 24 for convenience of description.

Figure 26:
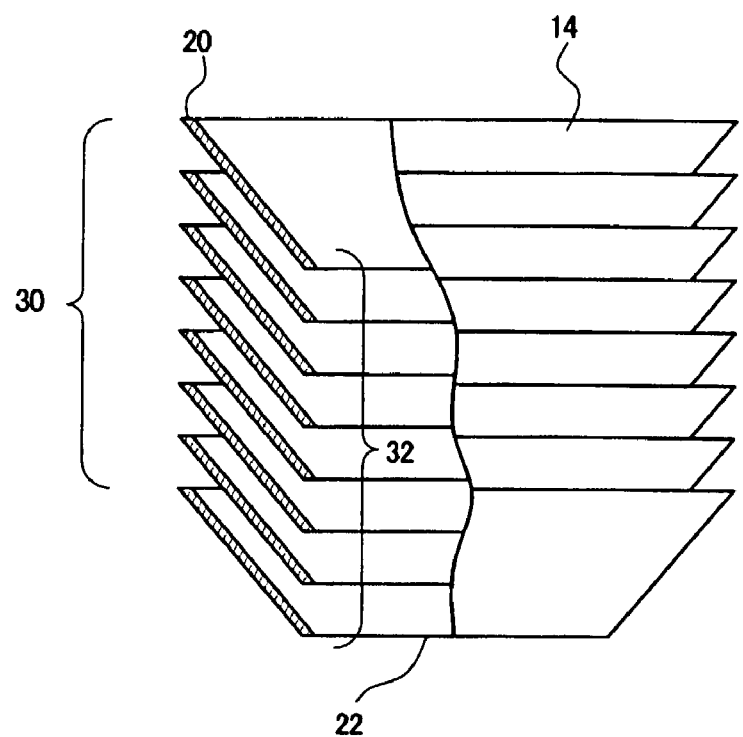
FIG. 26 is a schematic view of a large ring end and a small ring end which respectively forming an outer surface and an inner surface of the coaxial stacking morphology of truncated conical tubular graphene layers.

FIG. 26 is a schematic view of FIG. 24. Each of the hexagonal carbon layers 10 has a large ring end 20 and a small ring end 22 at opposite ends in the axial direction. The large ring ends 20 are stacked in the axial direction A to form an outer surface 30 of the carbon fiber 1. The small ring ends 22 are stacked in the axial direction A to form an inner surface 32 of the carbon fiber 1. The carbon fiber 1 is thus in the shape of a hollow core with no bridge and has a center hole 14.

An example of a method for manufacturing the carbon fiber 1 shown in FIG. 24 is described below.

A conventional vertical type reactor was used.

Benzene as a raw material was fed to a chamber of the reactor using a hydrogen stream at a flow rate of 0.3 l/h and a partial pressure equivalent to the vapor pressure at about 20° C. Ferrocene as a catalyst was vaporized at 185° C. and fed to the chamber at a concentration of about $3 \times 10-7$ mol/s. The reaction temperature and the reaction time were about 1100° C. and about 20 minutes, respectively. As a result, a carbon fiber having a herring-bone structure with an average diameter of about 100 nm was obtained. A hollow carbon fiber having no bridge at a length ranging from several tens of nanometers to several tens of microns, in which a number of hexagonal carbon layers in the shape of a bottomless cup are stacked, is obtained by adjusting the flow rate of the raw material and the reaction temperature (which are changed depending on the size of the reactor).

In the present embodiment, a carbon fiber product in which one to several hundreds of hexagonal carbon layers in the shape of a bottomless cup are stacked is obtained by grinding the carbon fiber in which a number of hexagonal carbon layers in the shape of a bottomless cup are stacked, as described later. The carbon fiber may be modified to a carbon fiber product with a desired length in which several thousands to several ten thousands of hexagonal carbon layers are stacked.

Characteristics of the carbon fiber product are described below.

Figure 1:
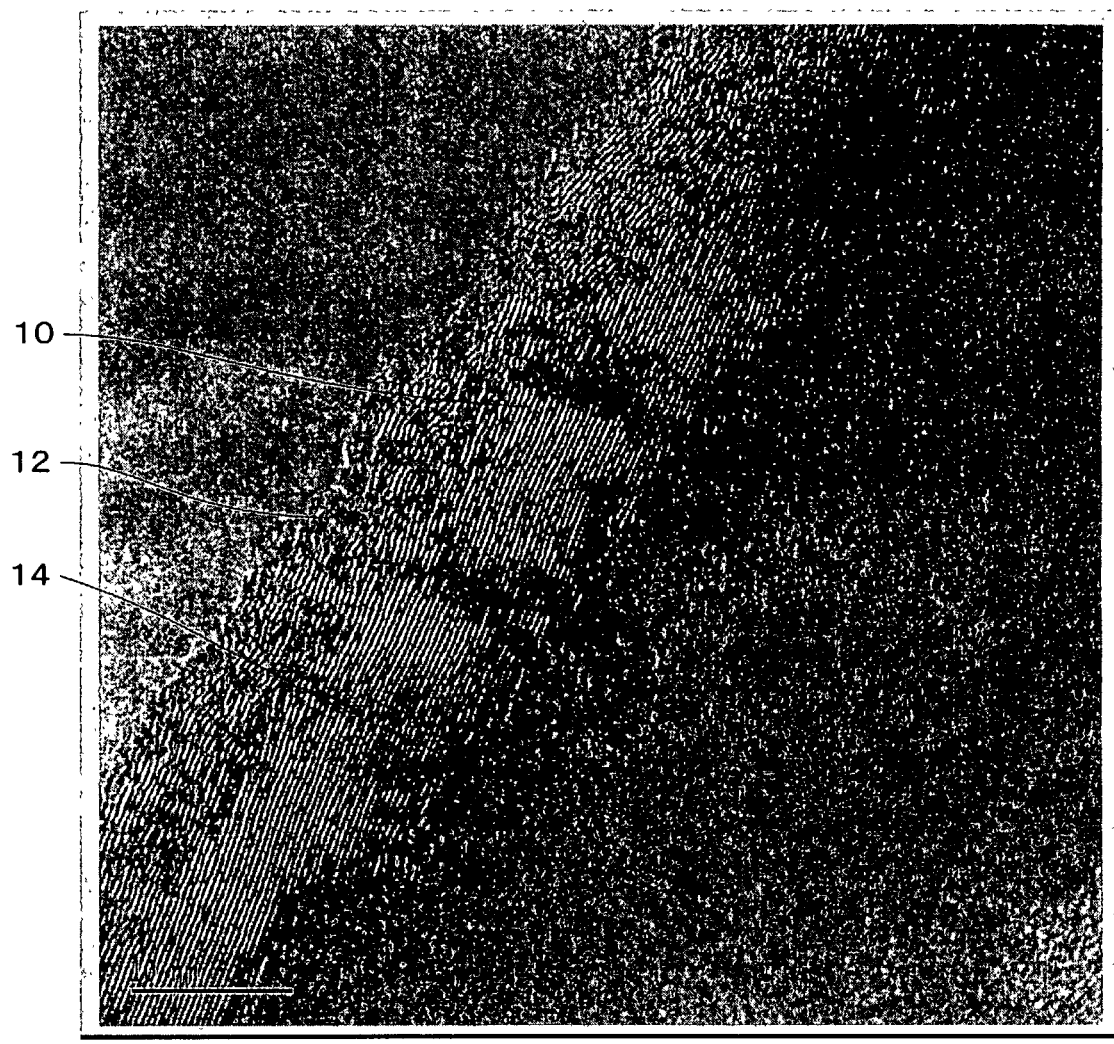
FIG. 1 is a copy of a transmission electron micrograph showing a carbon fiber having a herring-bone structure manufactured using a vapor growth process.
Figure 2:
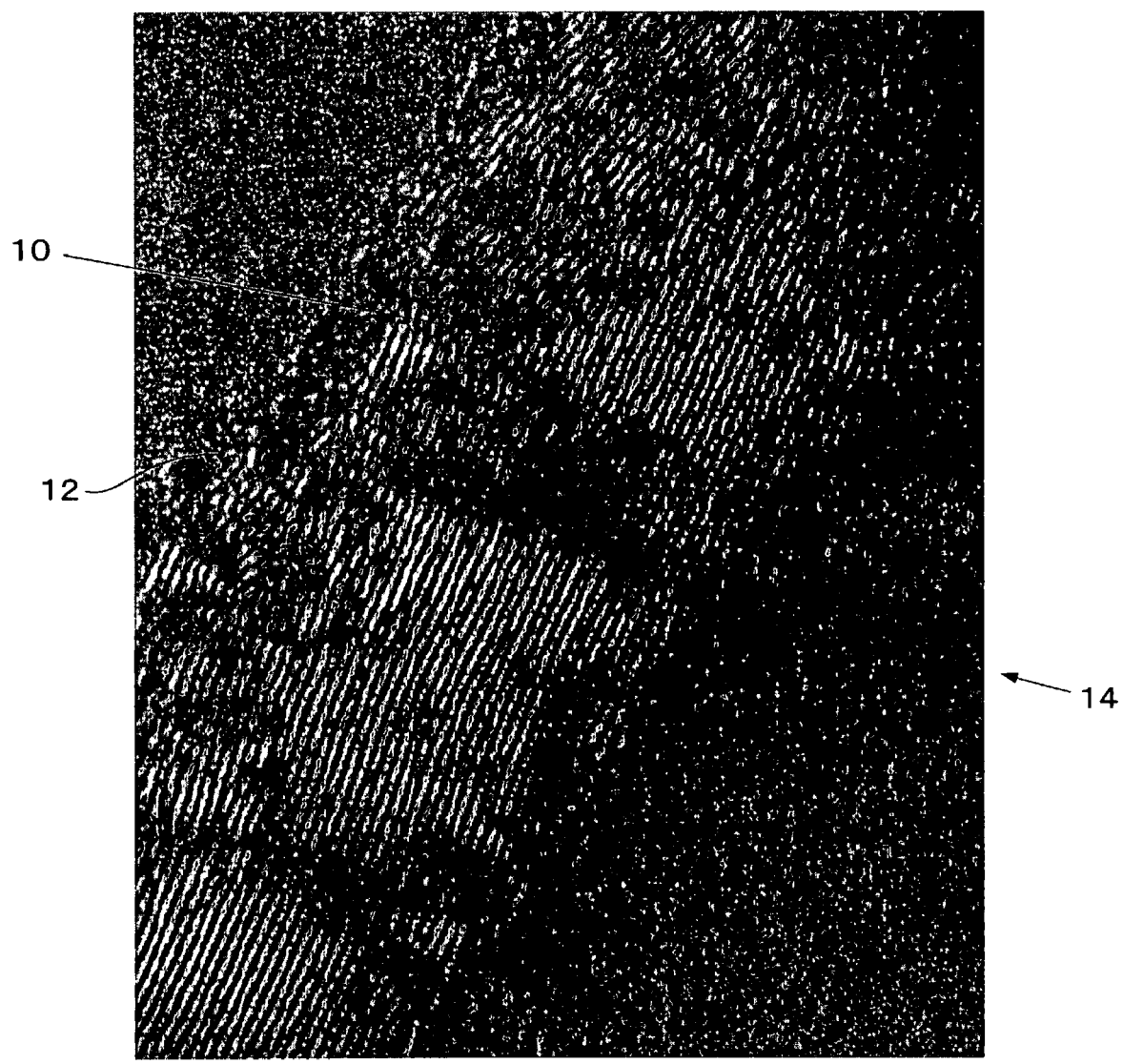
FIG. 2 is a copy of an enlarged micrograph of FIG. 1.
Figure 3:
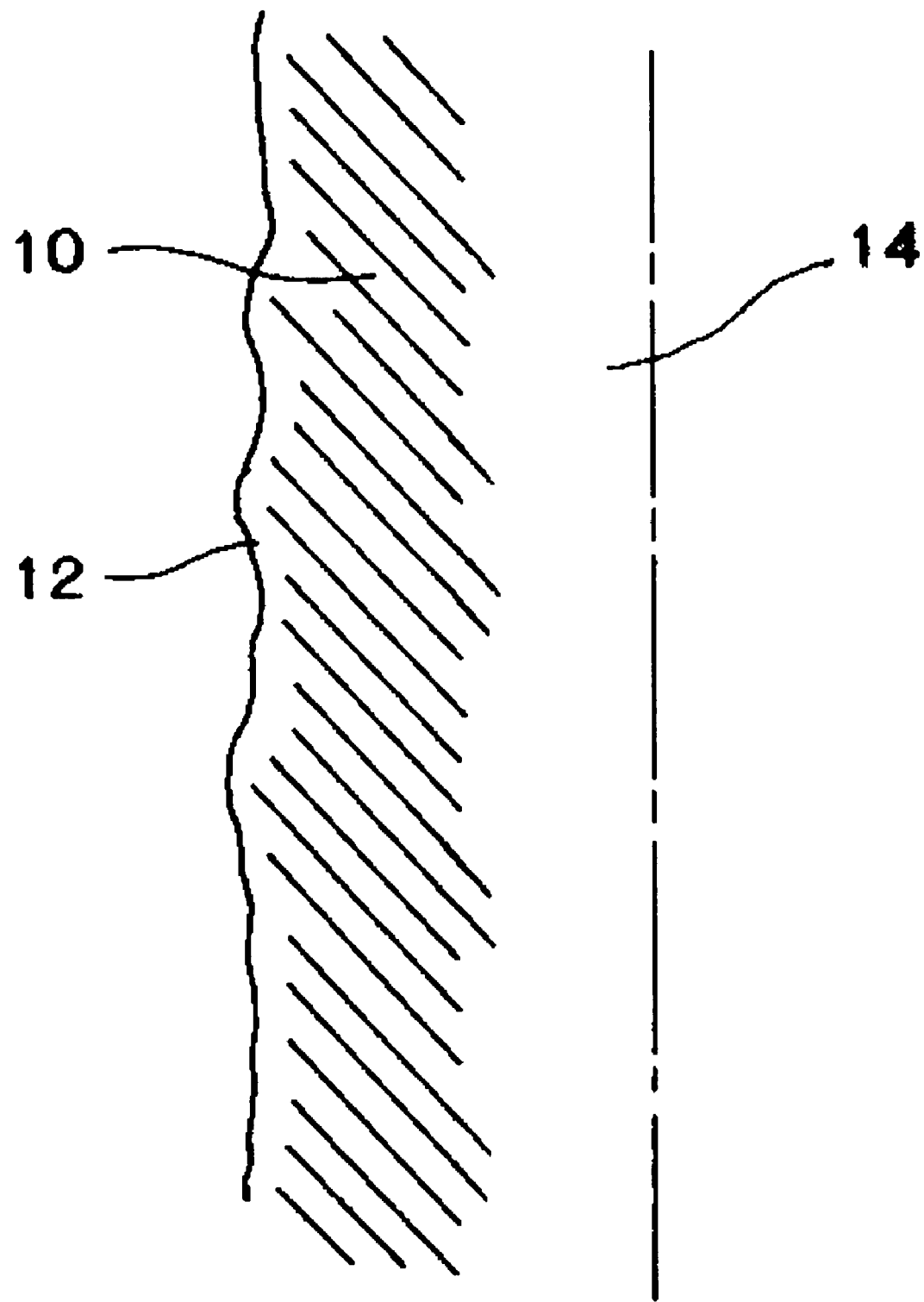
FIG. 3 is a schematic view of FIG. 2.

FIG. 1 is a copy of a transmission electron micrograph showing the carbon fiber having a herring-bone structure manufactured using the vapor growth process. FIG. 2 is a copy of an enlarged micrograph of FIG. 1, and FIG. 3 is a schematic view of FIG. 2.

As is clear from these figures, a deposited layer 12, in which an excess amount of amorphous carbon is deposited, is formed to cover the tilted hexagonal carbon layers 10. A reference numeral 14 indicates the center hole.

Figure 27:
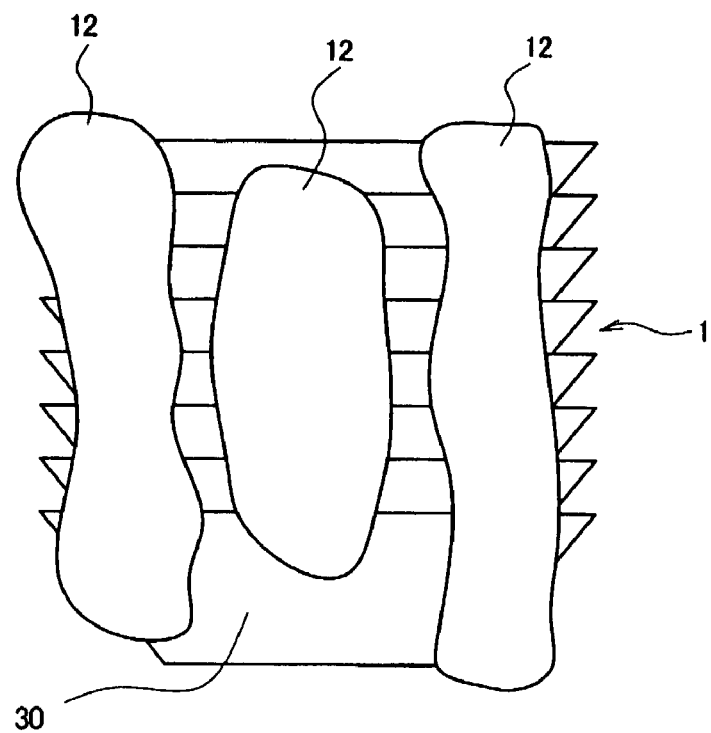
FIG. 27 is a schematic view of a deposited film of pyrolytic carbon formed over a wide area of an outer surface of a carbon fiber.

FIG. 27 is a view schematically showing a state in which the deposited films 12 are formed over a wide area of the outer surface 30 of the carbon fiber 1. As shown in FIG. 27, the hexagonal carbon layers 10 are exposed on the large ring ends 20 in the areas in which the outer surface of the carbon fiber 1 is not covered with the deposited films 12. These areas have a high degree of activity. In the area in which the inner surface of the carbon fiber 1 is not covered with the deposited films 12, the hexagonal carbon layers 10 are exposed on the exposed small ring ends 22.

The deposited layers 12 are oxidized and pyrolyzed by heating the carbon fiber on which the deposited layers 12 are formed at a temperature of 400° C. or more, preferably 500° C. or more, and still more preferably 520° C. to 530° C. for one to several hours in air. As a result, the deposited layers 12 are removed, whereby the edges of the hexagonal carbon layers are further exposed.

The deposited layers 12 may be removed by washing the carbon fiber with supercritical water, whereby the edges of the hexagonal carbon layers are exposed.

The deposited layers 12 may be removed by immersing the carbon fiber in hydrochloric acid or sulfuric acid and heating the carbon fiber at about 80° C. while stirring using a stirrer.

Figure 4:
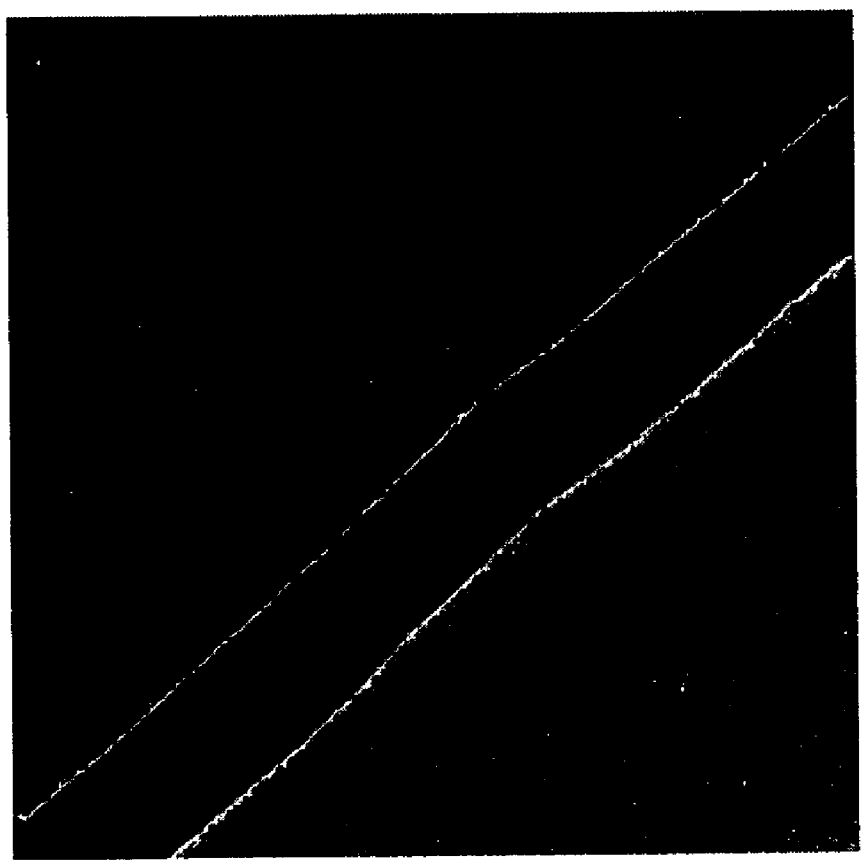
FIG. 4 is a copy of a transmission electron micrograph showing a carbon fiber having a herring-bone structure heated at a temperature of about 530° C. for one hour in air.
Figure 5:
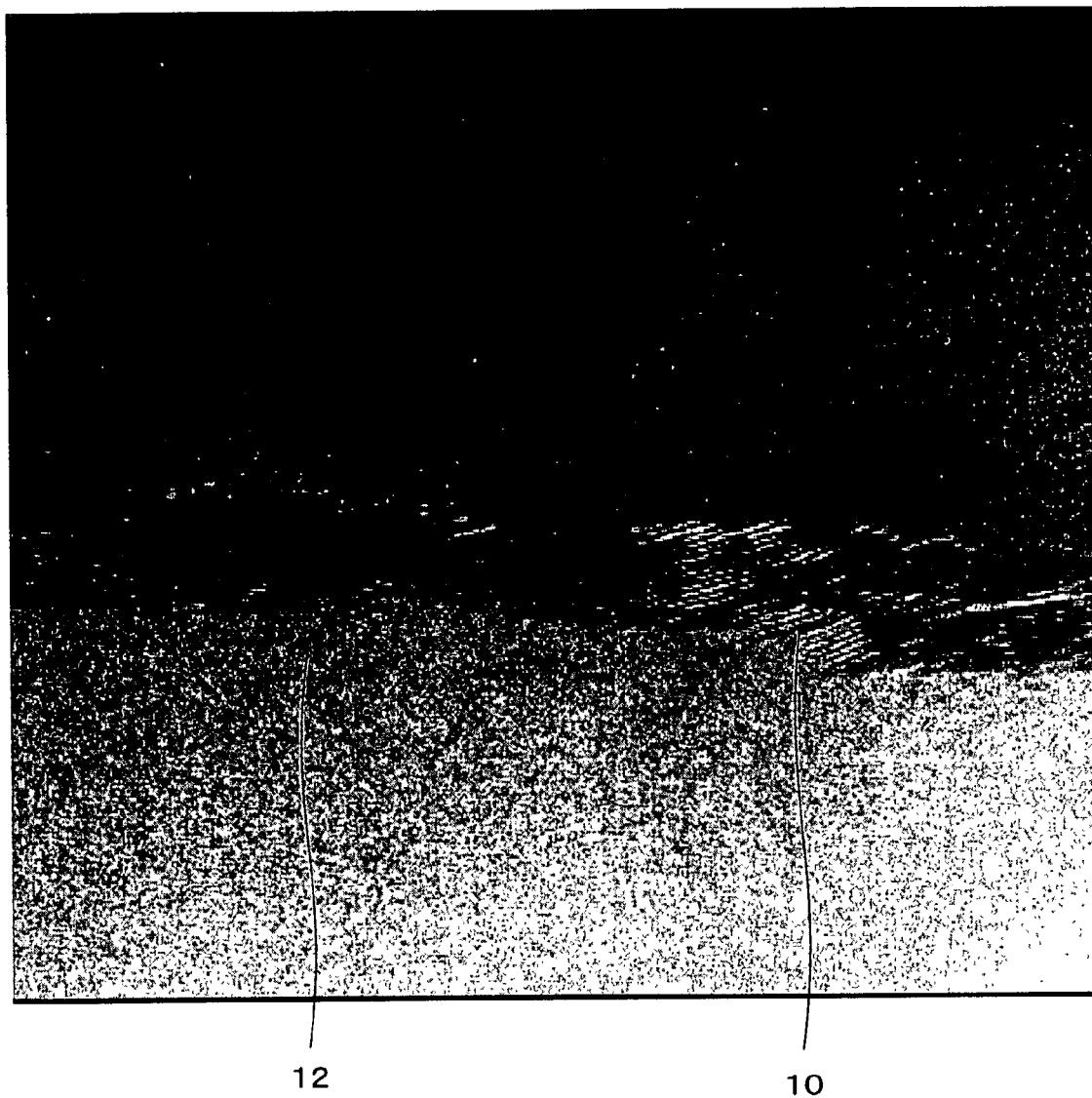
FIG. 5 is a copy of an enlarged micrograph of FIG. 4.

FIG. 4 is a copy of a transmission electron micrograph showing the carbon fiber having a herring-bone structure heated at a temperature of about 530° C. for one hour in air. FIG. 5 is an enlarged view of FIG. 4, FIG. 6 is an enlarged view of FIG. 5, and FIG. 7 is a schematic view of FIG. 6.

Figure 6:
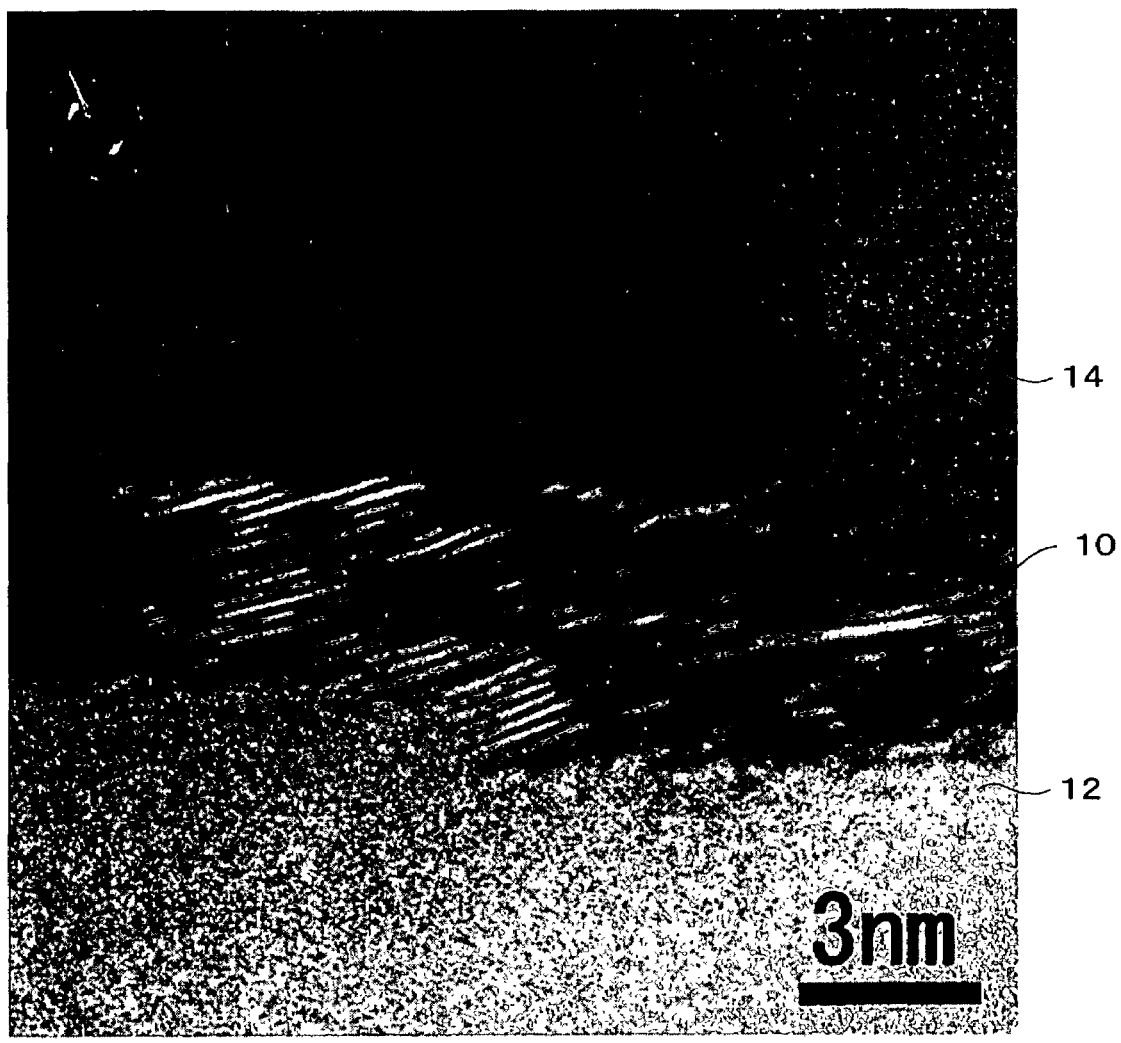
FIG. 6 is a copy of a further enlarged micrograph of FIG. 5.
Figure 7:
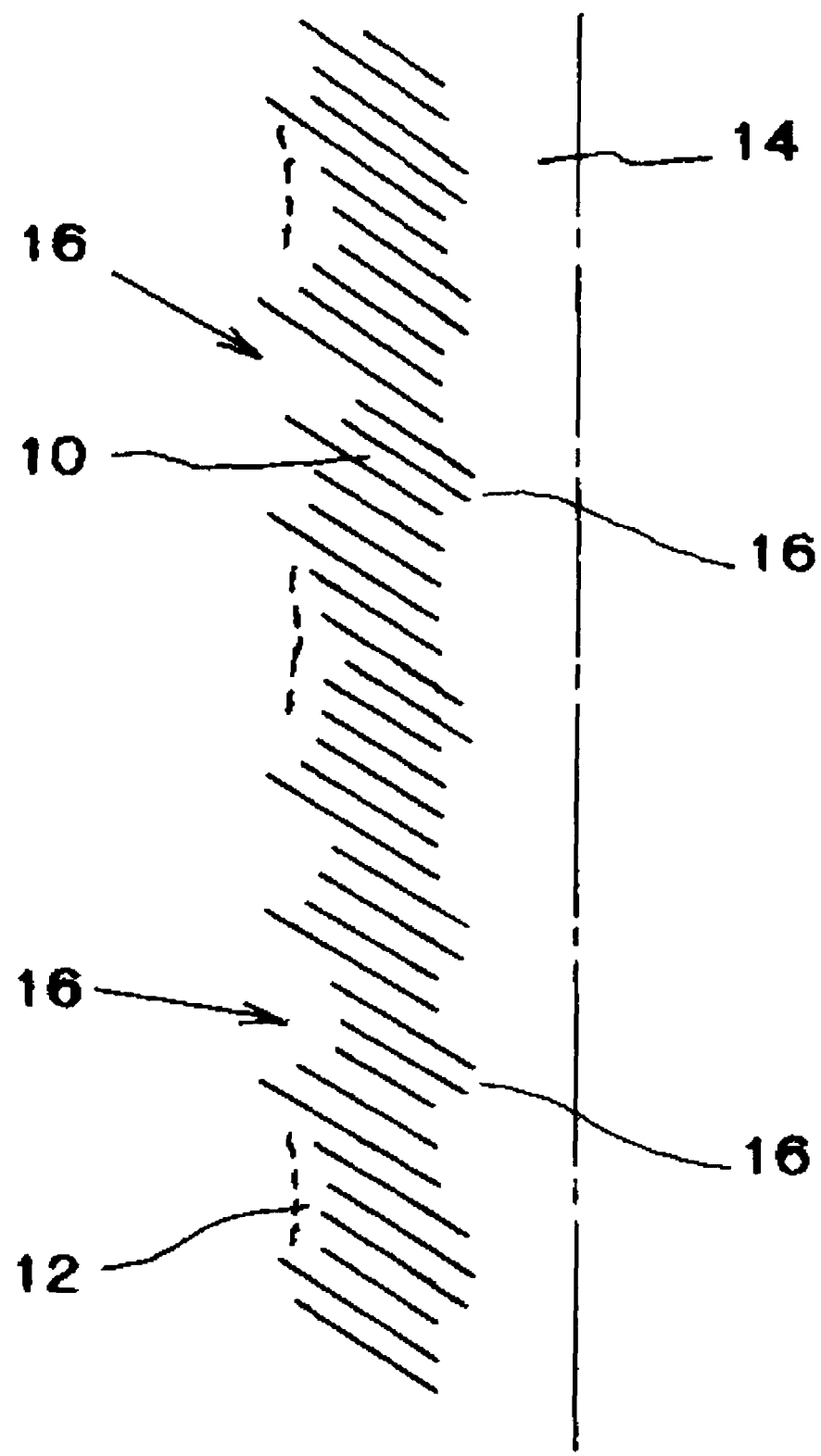
FIG. 7 is a schematic view of FIG. 6.

As is clear from FIGS. 5 to 7, part of the deposited layers 12 is removed by performing a heat treatment or the like, whereby the edges of the hexagonal carbon layers 10 are further exposed. The residual deposited layers 12 are considered to be almost pyrolyzed and merely attached to the carbon fiber. The deposited layers 12 can be removed completely by combining heat treatment for several hours and washing with supercritical water.

As is clear from FIG. 4, the carbon fiber 10 in which a number of hexagonal carbon layers in the shape of a bottomless cup are stacked is hollow at a length ranging at least from several tens of nanometers to several tens of microns.

The tilt angle of the hexagonal carbon layers with respect to the center line is from about 25° to 35°.

As is clear from FIGS. 6 and 7, the edges of the hexagonal carbon layers 10 on the outer surface and the inner surface are irregular in the area in which the edges of the hexagonal carbon layers 10 are exposed, whereby minute irregularities 16 at a nanometer (nm) level, specifically, at the level of atoms are formed. The irregularities 16 are unclear before removing the deposited layers 12 as shown in FIG. 2. However, the irregularities 16 appear by removing the deposited layers 12 by the heat treatment.

The exposed edges of the hexagonal carbon layers 10 have an extremely high degree of activity and easily bond to other atoms. The reasons therefor are considered to be as follows. The heat treatment in air causes the deposited layers 12 to be removed and the amount of functional groups containing oxygen such as a phenolic hydroxyl group, carboxyl group, quinone type carbonyl group, and lactone group, to be increased on the exposed edges of the hexagonal carbon layers 10. These functional groups containing oxygen have high hydrophilicity and high affinity to various types of substances.

In addition, the hollow structure and the irregularities 16 contribute to the anchor effects to a large extent.

Figure 8:
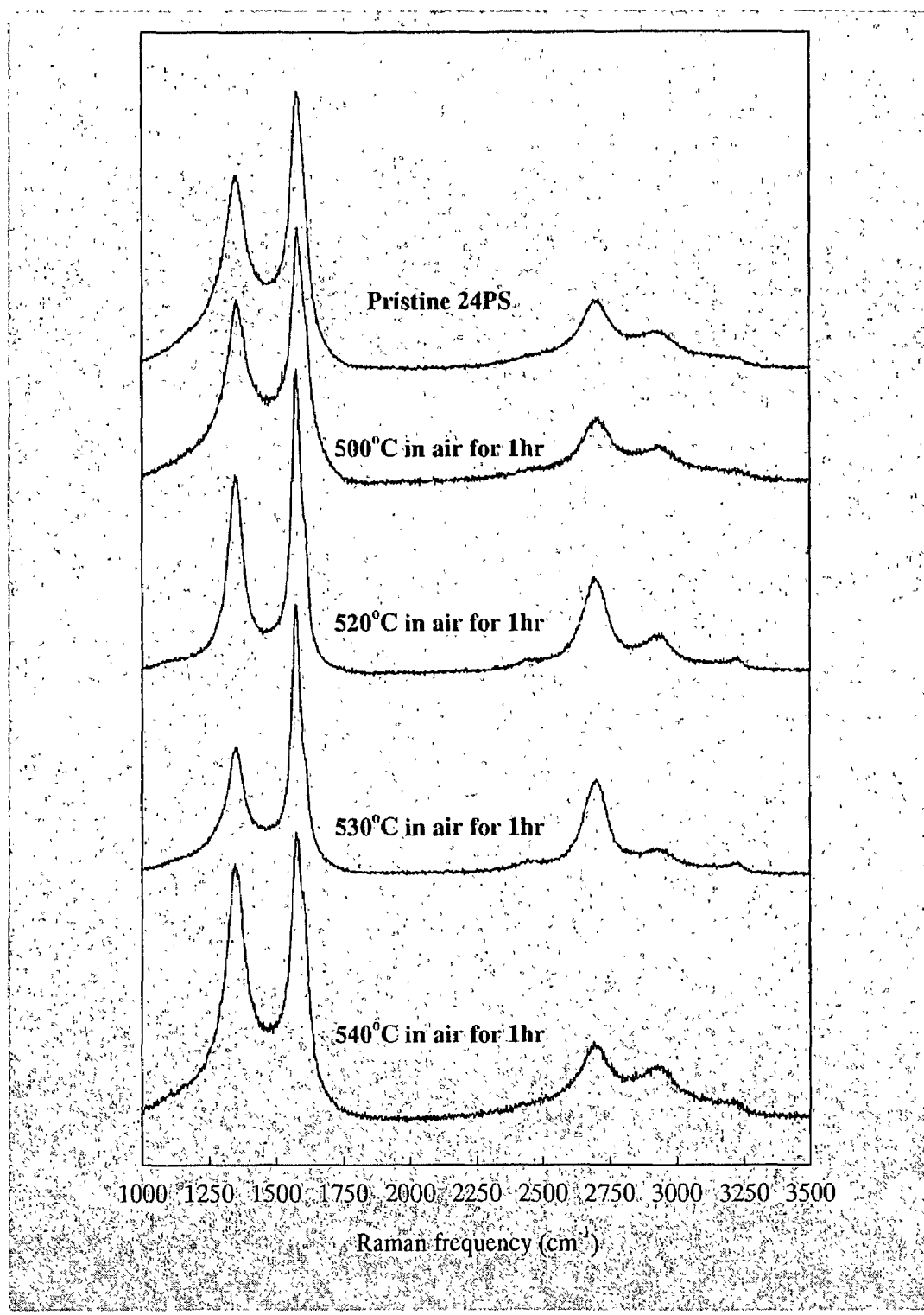
FIG. 8 is a characteristic chart showing the Raman spectra of a carbon fiber having a herring-bone structure (sample No. 24PS) after heating at 500° C., 520° C., 530° C., and 540° C. for one hour in air.

FIG. 8 shows the Raman spectra of a carbon fiber having a herring-bone structure (sample No. 24PS) after heating at 500° C., 520° C., 530° C., and 540° C. for one hour in air.

FIGS. 5 to 7 show that the deposited layers 12 are removed by the heat treatment. As is clear from the Raman spectra shown in FIG. 8, the presence of a D peak (1360 cm$^{-1}$) and a G peak (1580 cm$^{-1}$) shows that this sample is a carbon fiber and has no graphitized structure.

Specifically, the carbon fiber having a herring-bone structure is considered to have a turbostratic structure in which the carbon layers are disordered.

This carbon fiber has a turbostratic structure in which the hexagonal carbon layers are stacked in parallel but are shifted in the horizontal direction or rotated. Therefore, the carbon fiber has no crystallographic regularity.

The feature of this turbostratic structure is that intercalation of other atoms or the like seldom occurs. This is one of the advantages. Specifically, atoms or the like are easily supported on the exposed edges of the hexagonal carbon layers having a high degree of activity, since the substances are scarcely intercalated. Therefore, the carbon fiber is expected to function as an efficient support.

Figure 9:
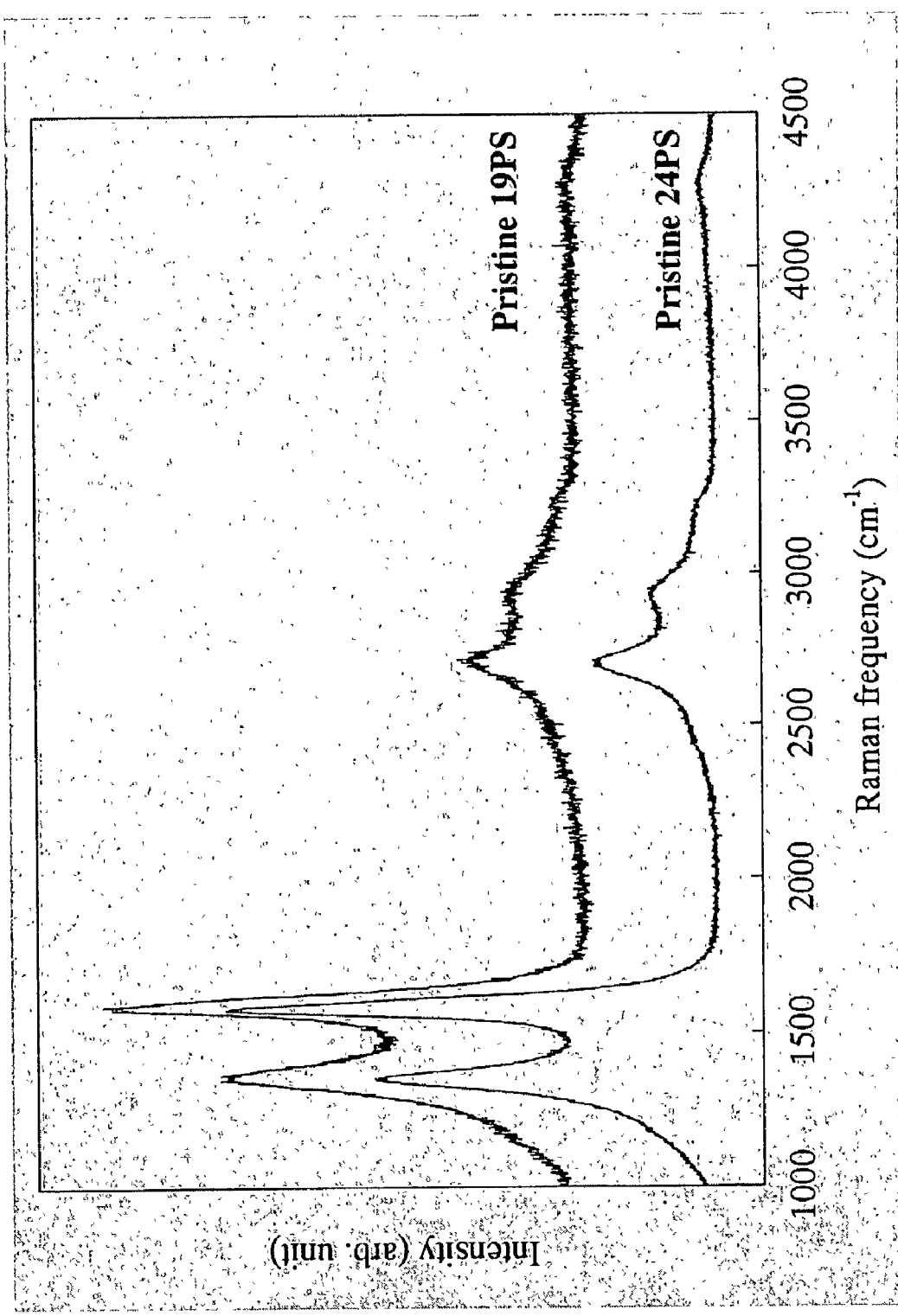
FIG. 9 is a characteristic chart showing the Raman spectra of carbon fiber samples No. 19PS and No. 24PS in which edges of hexagonal carbon layers are exposed by the heat treatment.

FIG. 9 shows the Raman spectra of carbon fiber samples No. 19PS and No. 24PS in which the edges of the hexagonal carbon layers are exposed by the above heat treatment.

Figure 10:
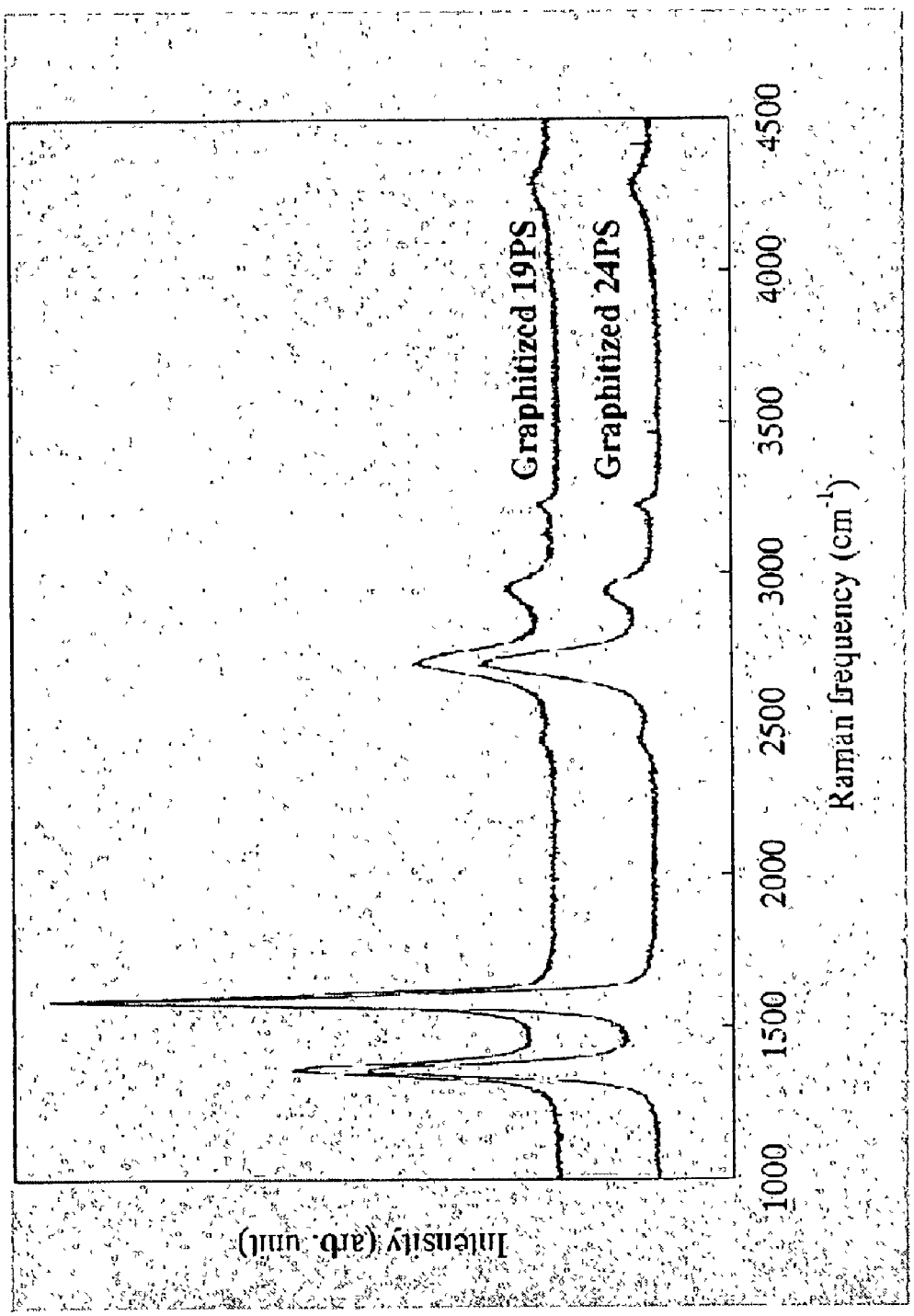
FIG. 10 is a characteristic chart showing the Raman spectra of the carbon fiber samples No. 19PS and No. 24PS, heated at 3000° C. after the edges of the hexagonal carbon layers has been exposed.

FIG. 10 shows the Raman spectra of the carbon fiber samples No. 19PS and No. 24PS, in which the edges of the hexagonal carbon layers are exposed, after heating at 3000° C. (common graphitization treatment).

As shown in FIG. 10, the D peak does not disappear even if the carbon fiber in which the edges of the hexagonal carbon layers are exposed is subjected to the graphitization treatment. This means that the carbon fiber is not graphitized by the graphitization treatment.

A diffraction line did not appear at the 112 plane in X-ray diffractometry (not shown). This also shows that the carbon fiber was not graphitized.

It is considered that the carbon fiber is not graphitized by the graphitization treatment because the deposited layers 12, which are easily graphitized, have been removed. This also shows that the remaining portions of the herring-bone structure are not graphitized.

The fact that the carbon fiber is not graphitized at a high temperature means that the carbon fiber is thermally stable.

The carbon fiber having the herring-bone structure thus obtained is a short fiber with a length of several tens of microns in which several tens of thousands to several hundreds of thousands of bottomless cup-shaped, specifically, truncated conical tubular hexagonal carbon layers are stacked. This short fiber is insoluble due to a high molecular weight (length).

The carbon fiber product according to one embodiment of the present invention is obtained by dividing the above short fiber into pieces in which one to several hundreds of hexagonal carbon layers are stacked. The carbon fiber product becomes soluble if the molecular weight is reduced by decreasing the number of stacked layers, in particular, if the number of hexagonal carbon layers is one.

The short fiber may be divided by adding an appropriate amount of water or solvent and grinding the short fiber gently using a mortar and pestle.

Specifically, the short fiber (in which the deposited layers 12 may be formed, or part or all of the deposited layers 12 may be removed) is placed in a mortar, and ground mechanically and gently using a pestle.

The carbon fiber product in which one to several hundreds of hexagonal carbon layers are stacked can be obtained by experimentally determining the treatment time in a mortar.

Since the cyclic hexagonal carbon layers have a comparatively high strength and are bonded to one another by only a weak Van der Waals force, the cyclic hexagonal carbon layers are separated without being crushed between layers in which the bond is particularly weak.

It is preferable to grind the short fiber using a mortar and pestle in liquid nitrogen. Water in air is absorbed when liquid nitrogen is evaporated and becomes ice. Therefore, the short fiber can be separated between unit fiber layers as described above, while reducing mechanical stress by grinding the short fiber together with ice using a mortar and pestle.

The carbon fiber may be ground by ball milling on an industrial scale.

An example of adjusting the length of the carbon fiber product by ball milling is described below.

A ball mill manufactured by Kabushikigaisha Asahi Rika Seisakujo was used.

Balls used were made of alumina with a diameter of 5 mm. 1 g of the above carbon fiber, 200 g of alumina balls, and 50 cc of distilled water were placed in a cell, and treated at a rotational speed of 350 rpm. The carbon fiber was sampled when 1, 3, 5, 10, and 24 hours had elapsed.

Figure 11:
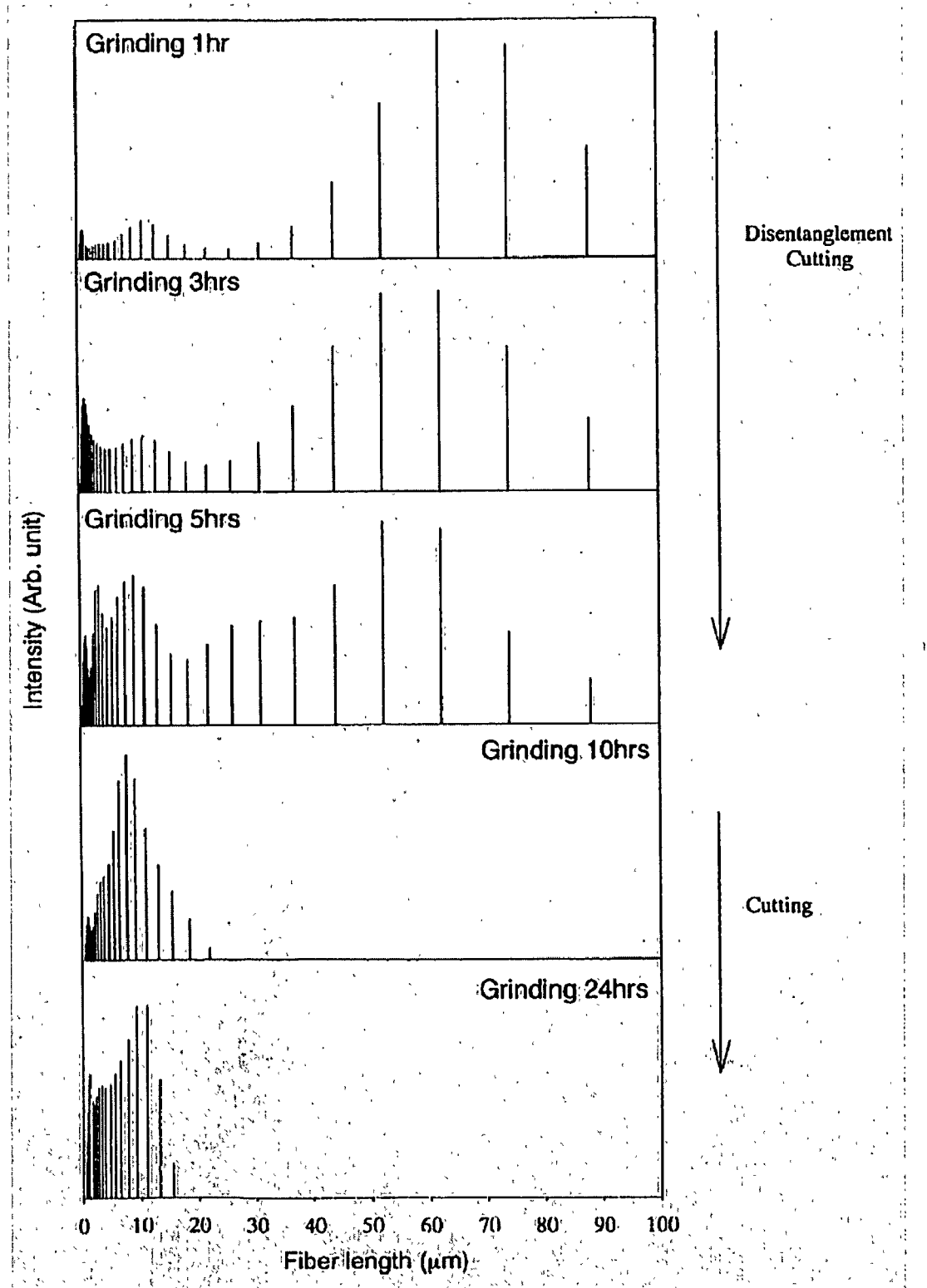
FIG. 11 is a graph showing distributions of the length of the carbon fiber with the passage of time at the time of grinding by ball milling.

FIG. 11 shows distributions of the length of the carbon fiber product measured using a laser particle size distribution analyzer at each sampling time.

As is clear from FIG. 11, the fiber length is decreased with the passing of milling time. In particular, the fiber length is decreased rapidly to 10 μm or less after 10 hours have elapsed. Another peak appears at about 1 μm after 24 hours have elapsed. This clearly shows that the fiber length was further decreased. The reason why the peak appears at about 1 μm is considered to be because the length almost equals the diameter, whereby the diameter is counted as the length.

This is clear from copies of electron micrographs shown in FIGS. 12 to 16.

Figure 12A:
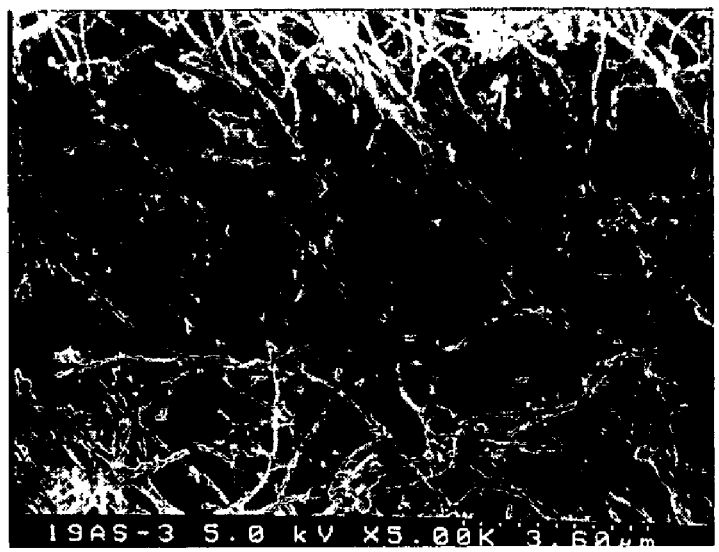
FIG. 12A is a copy of a transmission electron micrograph of the carbon fiber before ball milling and FIG. 12B is a copy of an enlarged micrograph of FIG. 12A.
Figure 12B:
Figure 13A:
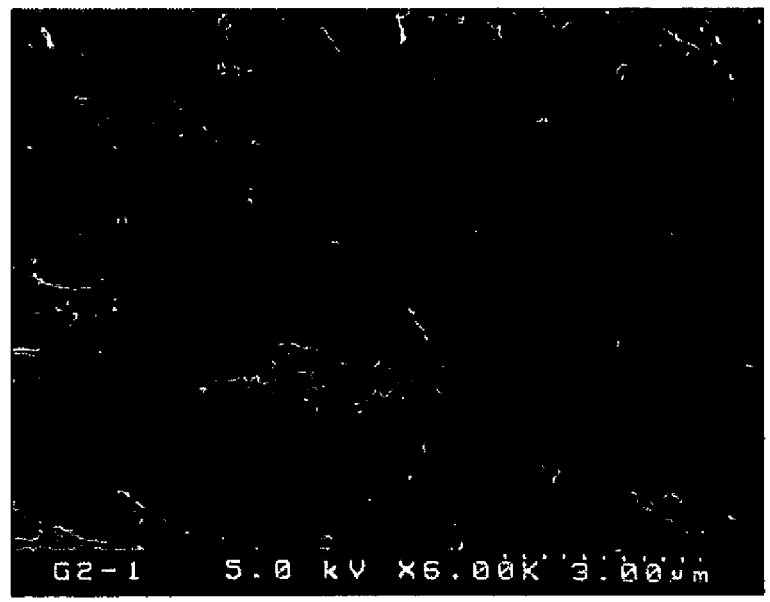
FIG. 13A is a copy of a transmission electron micrograph of the carbon fiber two hours after starting ball milling and FIG. 13B is a copy of an enlarged micrograph of FIG. 13A.
Figure 13B:
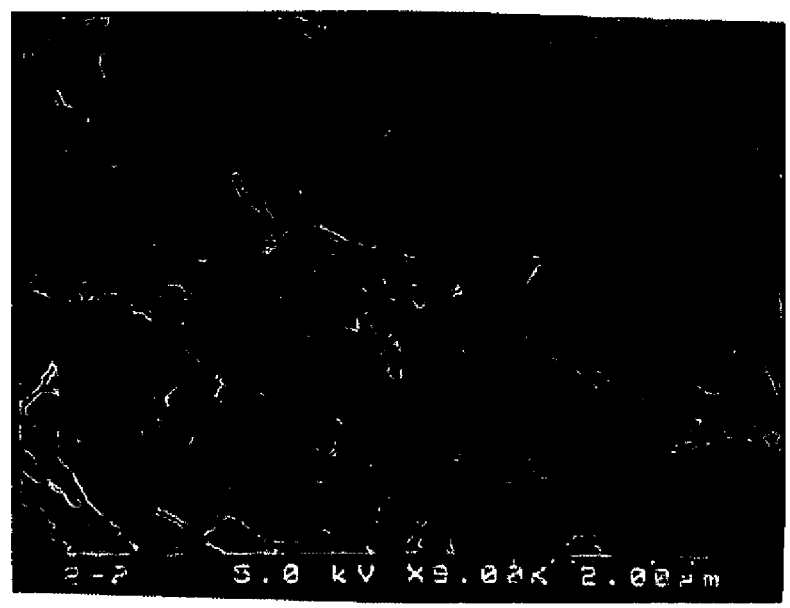
Figure 14A:
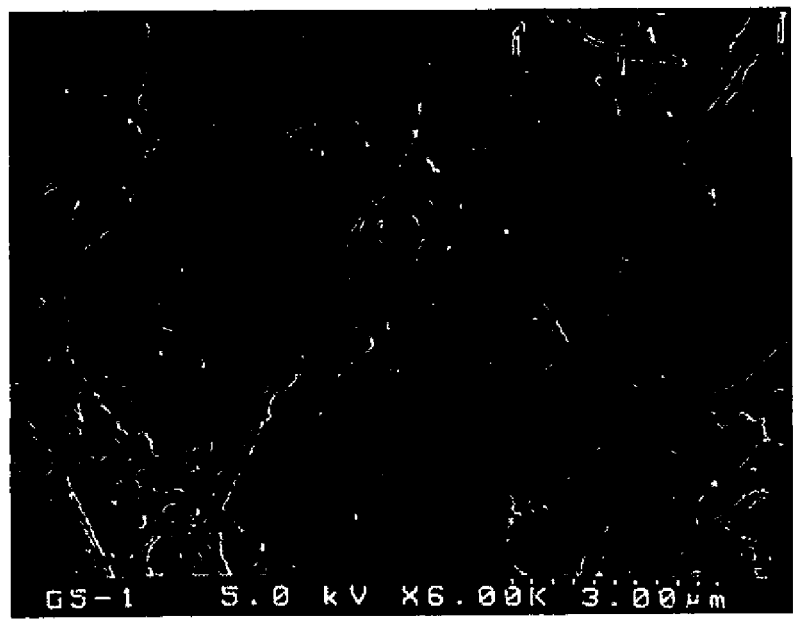
FIG. 14A is a copy of a transmission electron micrograph of the carbon fiber five hours after starting ball milling and FIG. 14B is a copy of an enlarged micrograph of FIG. 14A.
Figure 14B:
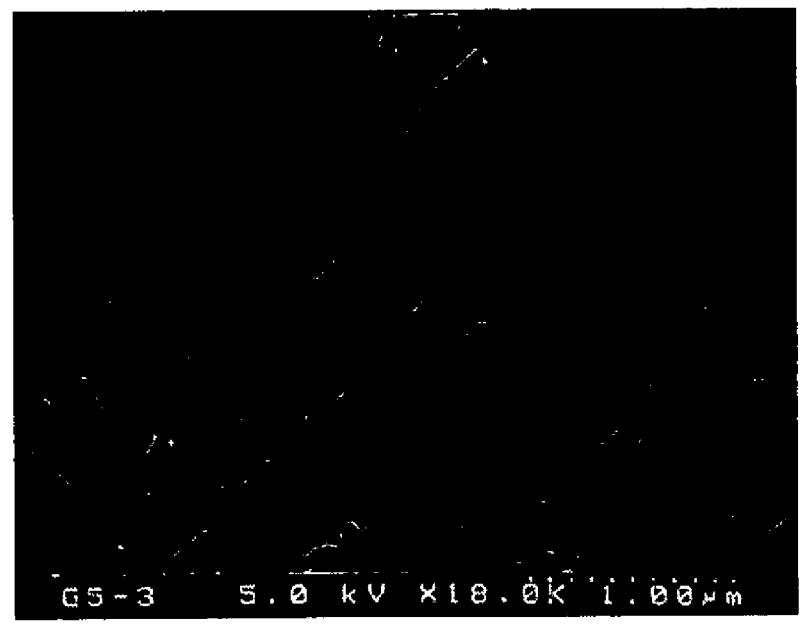
Figure 15A:
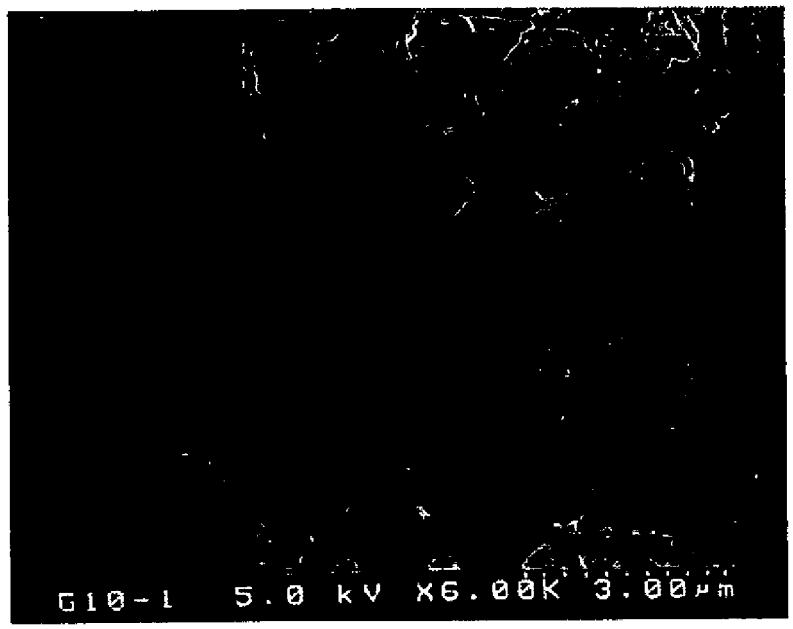
FIG. 15A is a copy of a transmission electron micrograph of the carbon fiber 10 hours after starting ball milling and FIG. 15B is a copy of an enlarged micrograph of FIG. 15A.
Figure 15B:
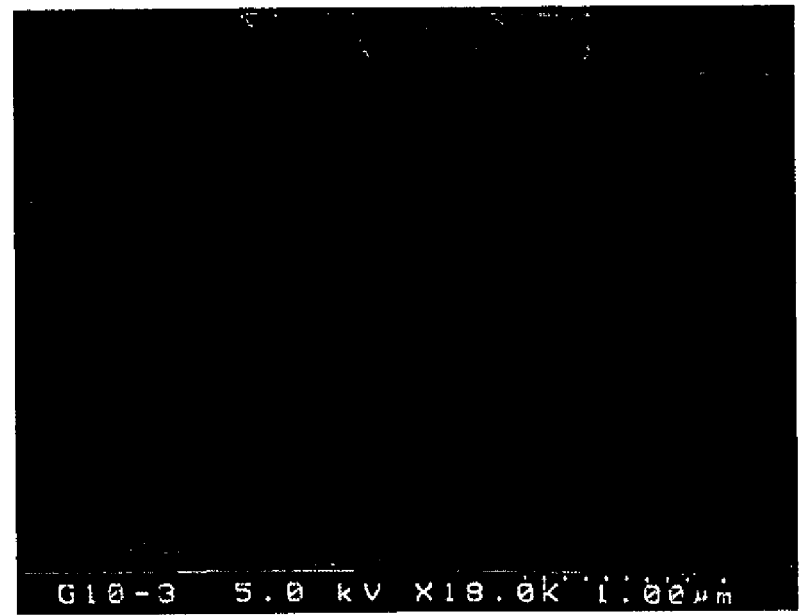

FIG. 12A and FIG. 12B shows the carbon fibers before milling. The carbon fibers with a length of several tens of microns get entangled, whereby the bulk density is extremely low.

Figure 16A:
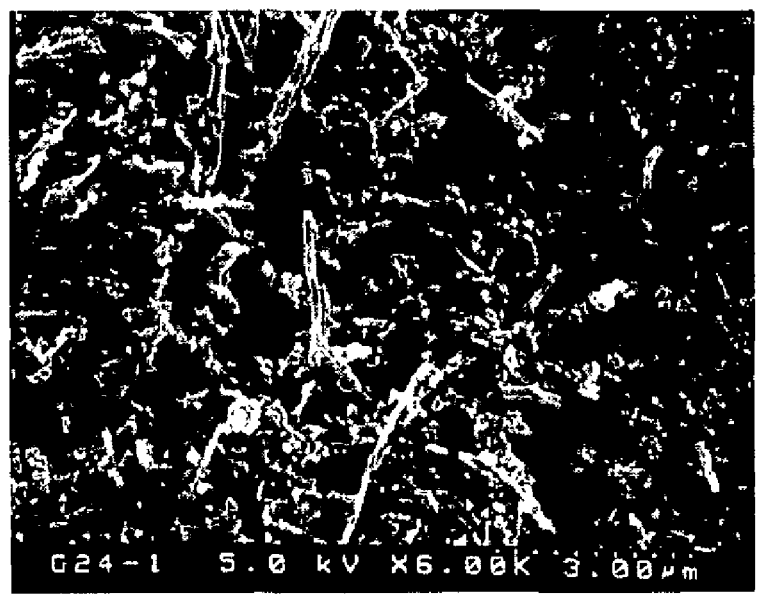
FIG. 16A is a copy of a transmission electron micrograph of the carbon fiber 24 hours after starting ball milling and FIG. 16B is a copy of an enlarged micrograph of FIG. 16A.
Figure 16B:
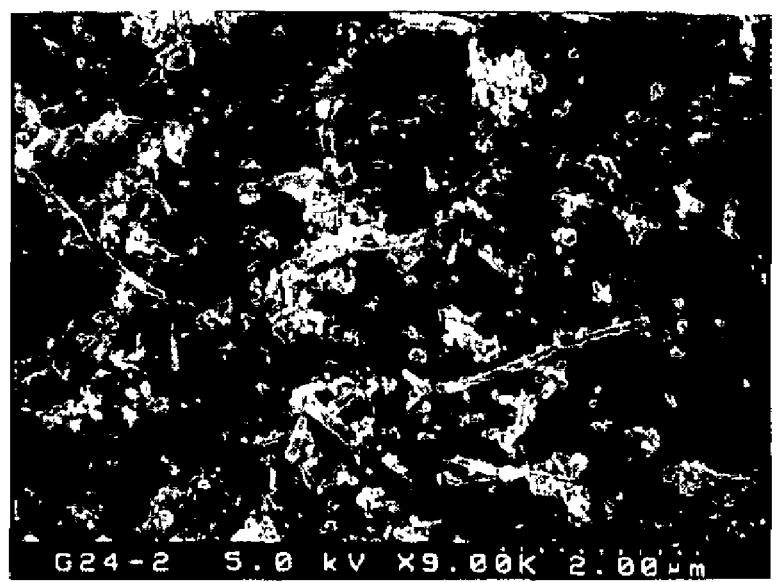

The fiber length is decreased with the passing of milling time from two hours (FIG. 13A, FIG. 13B) to five hours (FIG. 14A, FIG. 14B), 10 hours (FIG. 15A, FIG. 15B), and 24 hours (FIG. 16A, FIG. 16B). After 24 hours, the carbon fibers become almost particle-shaped, whereby entanglement of the fibers is rarely observed. As a result, the bulk density is increased.

Figure 17:
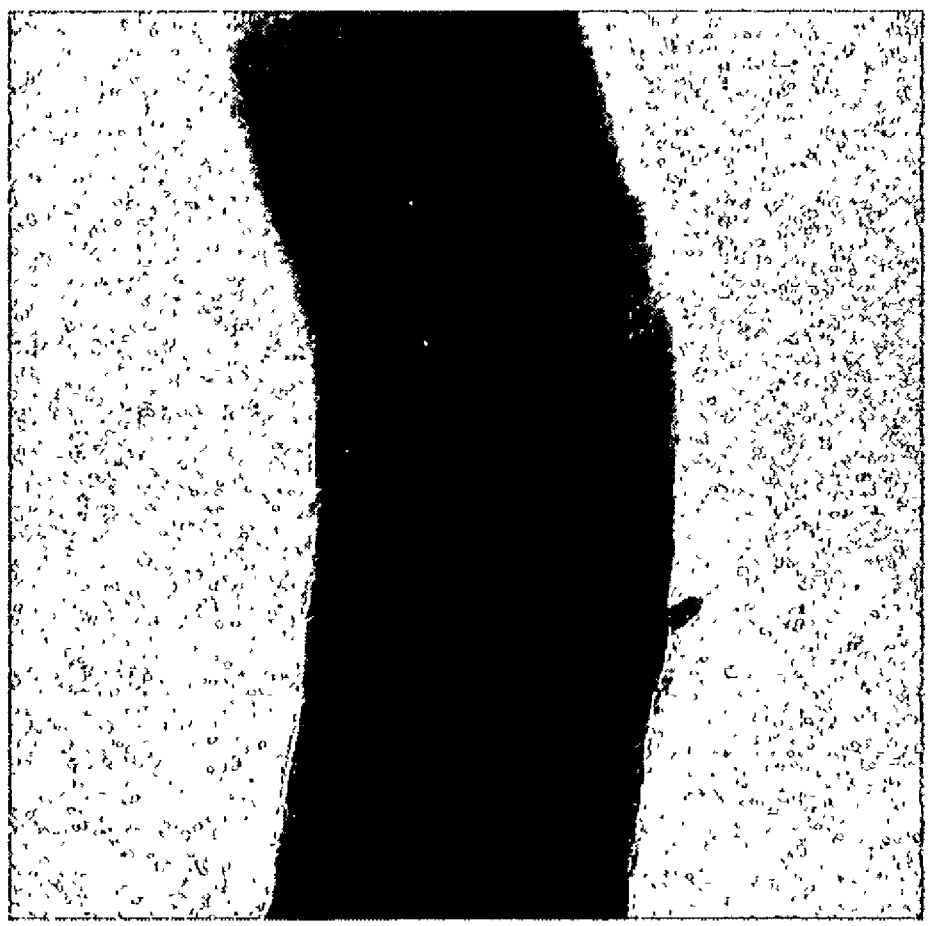
FIG. 17 is a copy of a transmission electron micrograph showing a state in which the hexagonal carbon layer in the shape of a cup starts to separate during ball milling.
Figure 18:
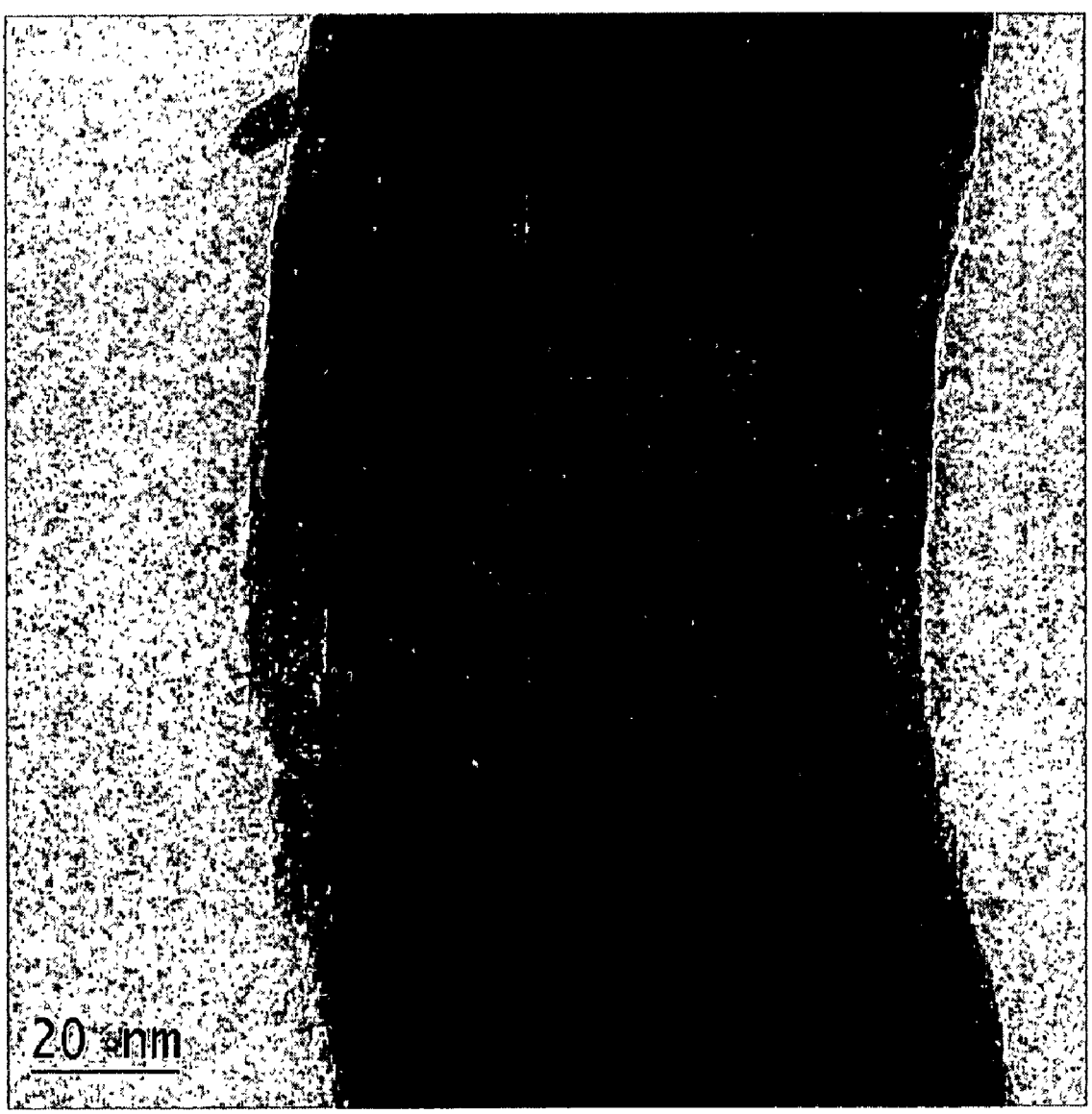
FIG. 18 is a copy of an enlarged micrograph of FIG. 17.
Figure 19:
FIG. 19 is a copy of an enlarged micrograph of FIG. 18.

FIGS. 17 to 19 are views showing copies of transmission electron micrographs showing a state in which the carbon fiber product is about to be divided during milling. FIGS. 18 and 19 are enlarged views of FIG. 17.

As is clear from these figures, the carbon fiber product is not divided by breakage of the fiber, but as a result of falling from the bottomless cup-shaped hexagonal carbon layer.

Figure 20:
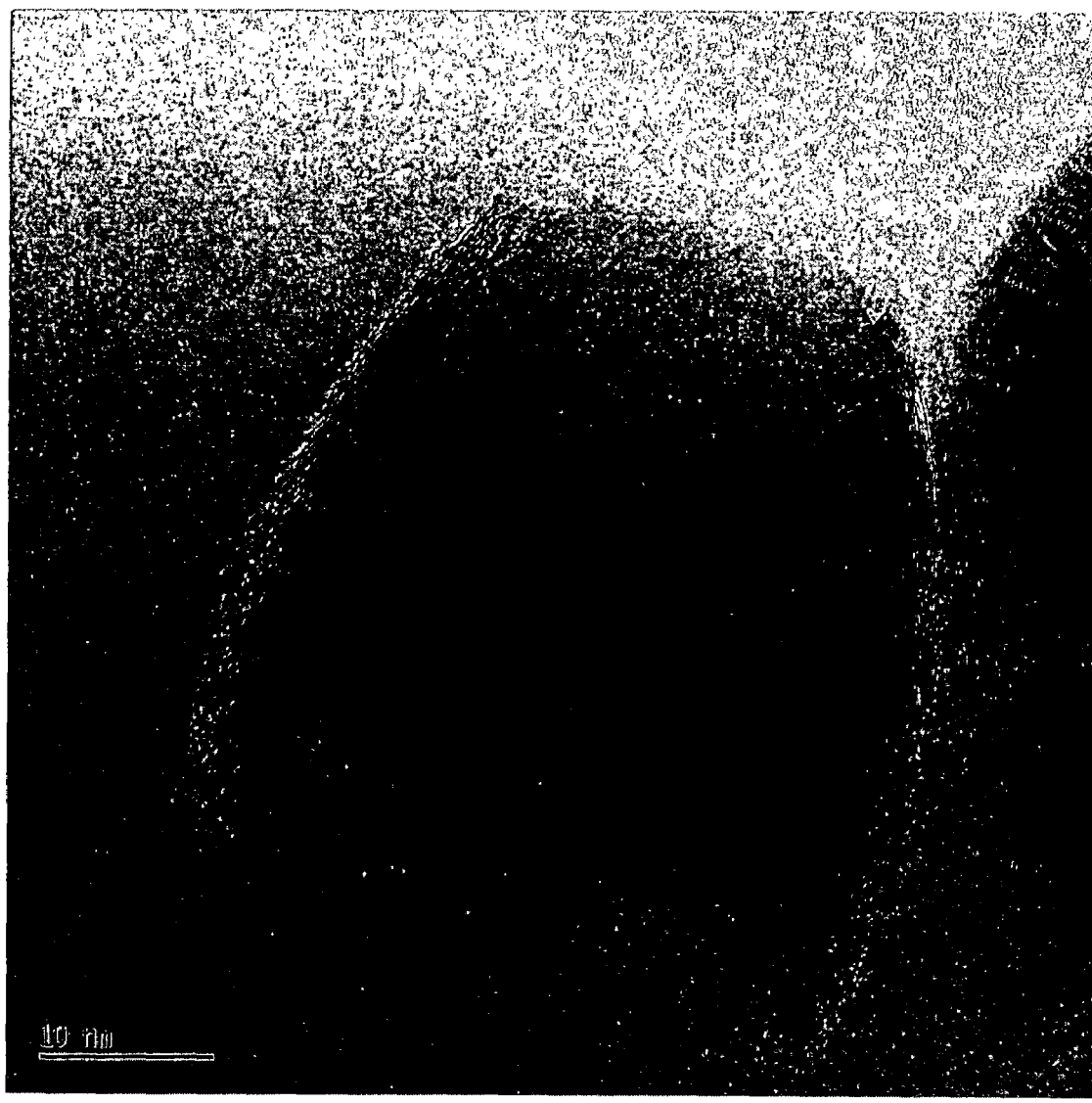
FIG. 20 is a copy of a transmission electron micrograph showing a state in which the carbon fiber is divided into a carbon fiber product in which several tens of bottomless cup-shaped hexagonal carbon layers are stacked.

FIG. 20 is a copy of a transmission electron micrograph showing a very interesting carbon fiber product of which the length is adjusted in a state in which several tens of bottomless cup-shaped hexagonal carbon layers are stacked. The carbon fiber product has a hollow shape with no bridge. The edges of the hexagonal carbon layers are exposed on the outer surface side and the inner surface side of the hollow portion. The length of the carbon fiber product may optionally be adjusted by changing the milling conditions.

The carbon fiber product shown in FIG. 20 is in the shape of a tube with a length and a diameter of about 60 nm which has a thin wall and a large hollow portion.

The bottomless cup-shaped hexagonal carbon layers are thus divided without crushing the shape of the hexagonal carbon layer.

In the case where a conventional concentric carbon nanotube is ground, various problems such as breakage of the tube causing fine split or cracks in the axial direction on the outer surface, or the crush of a core part may occur. Therefore, it is difficult to adjust the length.

As described above, the exposed edges of the hexagonal carbon layers 10 have an extremely high degree of activity and easily bond to other atoms. The reasons therefor are considered to be as follows. The heat treatment in air causes the deposited layers 12 to be removed and the number of functional groups containing oxygen such as a phenolic hydroxyl group, carboxyl group, quinone type carbonyl group, and lactone group to be increased on the exposed edges of the hexagonal carbon layers. These functional groups containing oxygen have high hydrophilicity and high affinity to various types of substances.

In addition, the hollow structure and the irregularities 16 contribute to anchoring effects to a large extent.

In the case where composites are manufactured by mixing the carbon fiber product with resin materials such as polyethylene, polypropylene, nylon, fluororesins such as FEP, PFA, and PTFE, polyesters, polyimides, and polycarbonates, the strength of these composites is improved remarkably.

The carbon fiber product may be mixed not only with the resin materials but also with other base materials such as metal materials (aluminum, copper, magnesium, for example) with good adhesion.

Figure 21:
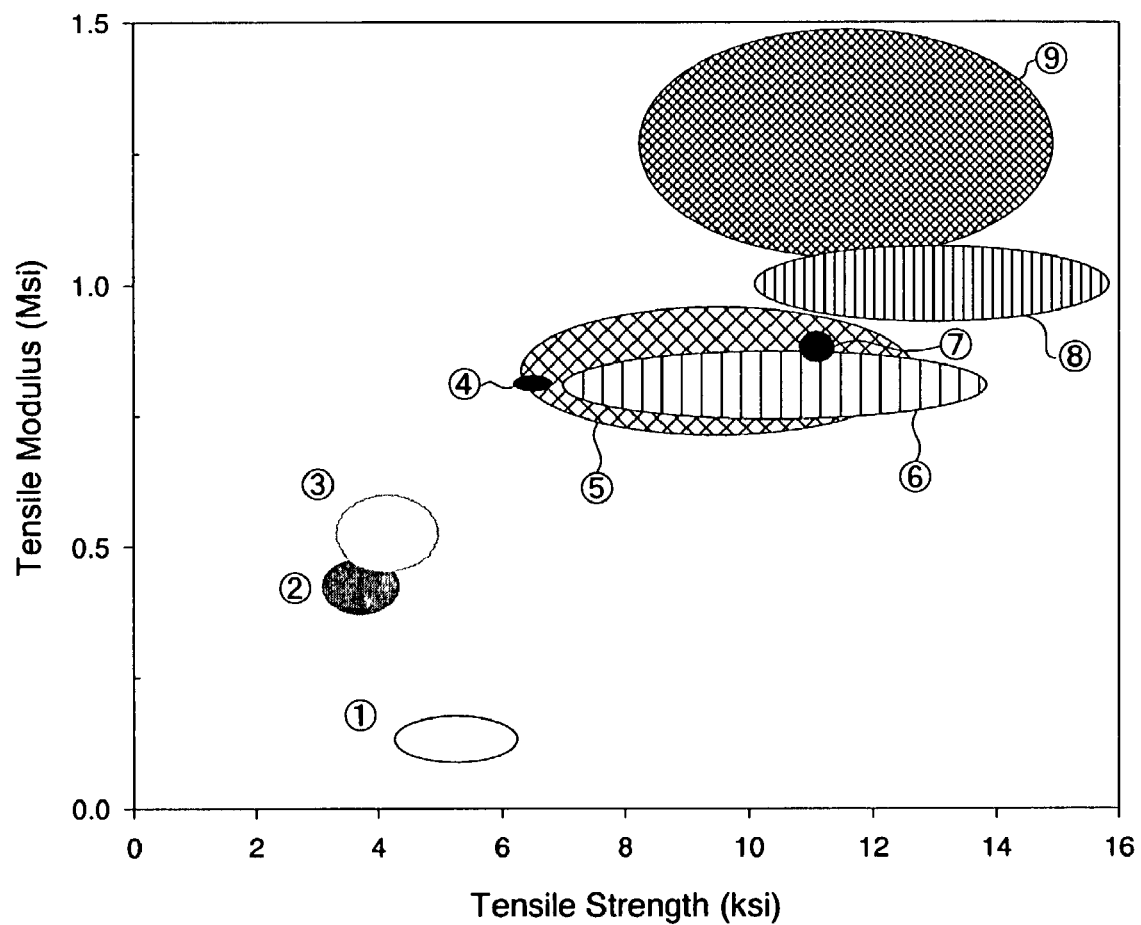
FIG. 21 is a characteristic chart showing tensile strength (horizontal axis) and tensile modulus (vertical axis) of various types of composites.

FIG. 21 shows tensile strength (horizontal axis) and tensile modulus (vertical axis) of composites in which reinforcing fibers or various types of fillers are mixed with polypropylene (base material). The case of mixing 30 wt % of an untreated herring-bone carbon fiber is denoted by ④, and the case of mixing 30 wt % of the carbon fiber product in which the deposited layers are removed by heat treatment is denoted by ⑦.

As is clear from FIG. 21, composites containing the carbon fiber have strength comparable to composites in which a glass fiber is mixed. In the case of mixing the carbon fiber product in which the edges of the hexagonal carbon layers are exposed by removing the deposited layers (⑦), the tensile strength is improved remarkably and the tensile modulus is improved moderately in comparison with the case of mixing the untreated herring-bone carbon fiber (④).

Generally, when the carbon fiber is mixed with a base material such as a resin material, the carbon fiber tends to break during mixing. Therefore, a large amount (10 wt % or more) of carbon fiber is mixed in order to improve the performance. However, since the carbon fiber product of the present invention has good adhesion to base materials such as resins, it suffices that the amount be in the range from 0.1 wt % or more to 10 wt % or less (preferably about 0.3 wt %) in terms of strength.

Moreover, the carbon fiber product having a herring-bone structure is deformed in the shape of the letter "S", the letter "Z", or a spiral due to external force applied during mixing and fits the base material. Therefore, a good twining effect is expected. Specifically, the carbon fiber has characteristics by which the carbon fiber seldom breaks and is easily bent, soft, twisted, rotated, and the like. These characteristics are obtained even if the deposited layers 12 are not removed. However, these characteristics are caused to occur significantly by removing the deposited layers 12.

As described above, since the carbon fiber product is in the shape of a fine particle in which several tens to several hundreds of bottomless cup-shaped hexagonal carbon layers are stacked, the carbon fiber product exhibits good dispersibility in resins. As a result, a resin composite having a flexibility and high strength can be obtained. The resin composite also excels in moldability using a metal mold, transfer characteristics on the surface of the metal mold, and sliding characteristics because mixing nanoparticles makes the surface smooth whereby coefficient of friction is reduced.

Since the above carbon fiber product securely cuts into resins, thermal expansion and shrinkage of the resins can be reduced, whereby a composite excelling in dimensional stability can be obtained. Since the composite excels in dimensional stability and has conductivity, the composite exhibits no warping nor twisting even if the composite is formed thinly. Therefore, the composite can be suitably used as a separator for fuel cells and the like.

Since the composite excels in transfer characteristics on the surface of a metal mold as well as dimensional stability, the composite is suitably used for minute mechanical parts such as minute gears for measuring instruments or watches, for which a high degree of precision is needed.

Moreover, the center hole of the carbon fiber product is impregnated with lubricating oil and the lubricating oil is thus mixed with the resin, so that sliding characteristics can be given. Since the lubricating oil seeps out from the center hole at a nanometer level during sliding, the sliding characteristics can be improved remarkably.

Furthermore, the composite with a resin is suitable as a material for golf clubs or tennis rackets due to high rigidity.

A conductive fiber can be obtained by mixing the carbon fiber product with nylon or the like. In this case, since the carbon fiber product is minute and does not clog a spinning nozzle, the carbon fiber product is suitably used.

Since the present carbon fiber product is fibrous differing from powdered carbon black, the carbon fiber product is rarely cut even if it is dispersed in a resin film. These advantages enable production of not only a thin block-shaped film, but also a ultra thin film having conductivity and maintaining strength. The thickness of the film can be adjusted from several microns to several hundreds of microns.

Composites such as conductive rubbers, cushion materials or buffers such as rubber pads, and tires can be obtained by mixing the present carbon fiber product with rubber. In particular, tires in which the carbon fiber product is mixed excel in abrasion resistance and exhibit high friction force and superior grip characteristics.

Concrete which rarely breaks and has high strength can be provided by mixing the carbon fiber product with concrete, cement, or glass.

Furthermore, addition of the carbon fiber product to various types of plating solutions increases conductivity of the plating solutions.

The exposed edges of the hexagonal carbon layers 10 of the carbon fiber product have an extremely high degree of activity and easily bond to other atoms.

A carbon fiber product on which catalytic metal is supported was manufactured using this carbon fiber product.

An example of a manufacturing method is described below.

1. The carbon fiber product was mixed in a solution of ethanol and chloroplatinic acid. The mixture was stirred for one hour.
2. An aqueous solution of sodium borohydride was added to the above mixture to reduce chloroplatinic acid.
3. After one minute of reduction treatment, a aqueous solution of hydrochloric acid was added to the mixture to decompose an excessive amount of sodium borohydride.
4. After five minutes, a carbon fiber product on which catalytic metal was supported was removed by filtration.

5. After filtration, the carbon fiber product was immersed in an aqueous solution of ammonium bicarbonate to neutralize the catalytic metal, and then washed with purified water.
6. After removing the water, the mixture was dried under vacuum to obtain a carbon fiber product on which catalytic platinum metals were supported.

Figure 22:
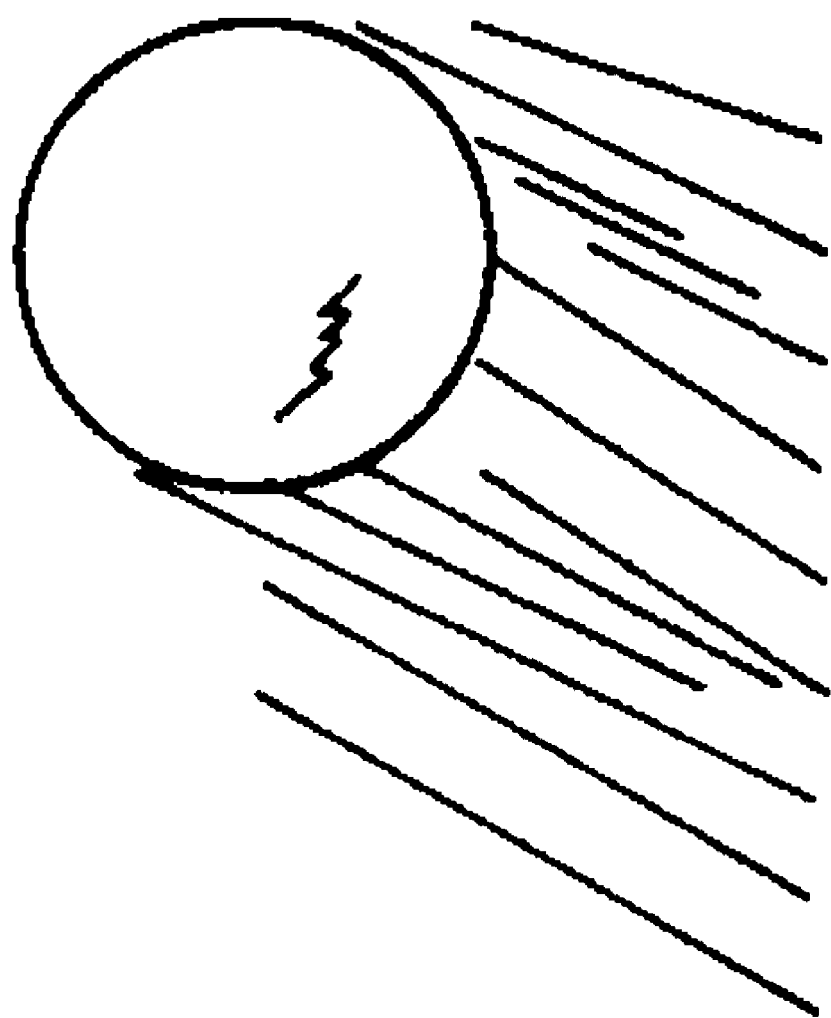
FIG. 22 is a view schematically showing a state in which the catalytic metal is supported.

FIG. 22 is a view schematically showing the carbon fiber product in a state in which the catalytic metal (platinum) is supported.

The size of the platinum atom is about 30 Å and the interval between the hexagonal carbon layers is 3.5 Å. The platinum atom is supported in an area corresponding to about ten layers of the hexagonal carbon layers 10.

Figure 23:
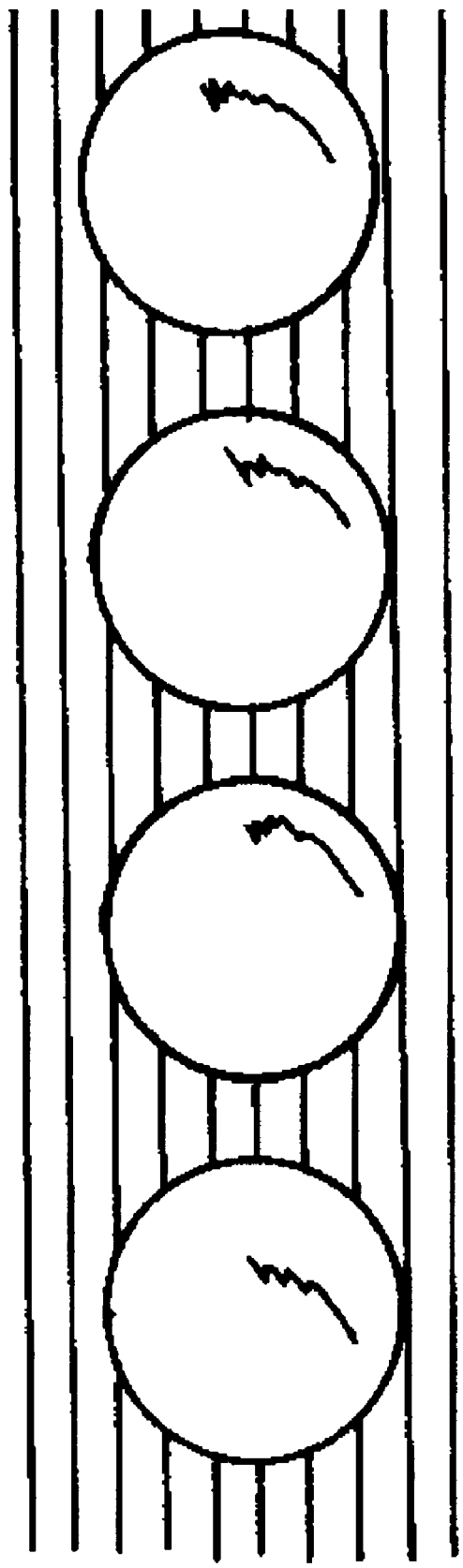
FIG. 23 is a view showing a state in which catalytic metal is supported in a chain.

Irregularities exist in the area in which the edges of the hexagonal carbon layers are exposed as described above. The platinum atom is held in the concave section of these irregularities. The concave sections are in the shape of grooves which extend almost in the circumferential direction. A large number of platinum metal particles are held in the grooves continuously in a chain, as shown in FIG. 23.

Since the carbon fiber product is very minute with a diameter of about 100 nm, a large number of platinum metal particles are held, whereby the catalytic effect is remarkable.

The carbon fiber product on which the catalytic platinum metals are supported can be suitably used as a catalyst for lithium ion fuel cells and the like. The carbon fiber can be used as a catalyst not only for lithium ion fuel cells but also for other applications.

The carbon fiber product can be used as a support for catalytic metals such as a platinum alloy, ruthenium, or palladium in addition to platinum.

Solubility of the carbon fiber product in a solvent is described below.

The exposed cyclic edges of the hexagonal carbon layers are extremely chemically active.

The edges are modified with a carboxyl group. A hydroxyl group of the carboxyl group is replaced by chlorine using $SOCl_2$. The chlorine is modified with octadecylamine [$CH_3(CH_2)_{17}NH_2$] and dichlorocarbene to obtain a carbon fiber product which is soluble in various types of solvents such as aromatic solvents including benzene and toluene, and carbon disulfide. If one to several stacked hexagonal carbon layers are included, the carbon fiber product can dissolve in water by changing the modifying group.

A conductive resin can be obtained by mixing the carbon fiber product which is soluble in various types of solvents with a resin material.

For example, a conductive resin may be obtained by dissolving the carbon fiber product in a solvent such as toluene and mixing this solution with a resin material such as an epoxy resin or phenol-formaldehyde resin.

A circuit substrate such as an FPC (flexible printed circuit) may be formed by screen printing a desired pattern on a flexible resin sheet such as polyimide using the conductive resin, and removing the solvent by drying.

A conductive resin may be formed by mixing a conventional vapor grown carbon fiber with a resin material. However, in the case of forming a circuit pattern using this conductive resin in the same manner as in the above example, it is difficult to form a flat circuit pattern due to the presence of fibrous carbon. Moreover, in the case of a substrate which is bent at all times such as the FPC, the circuit pattern tends to break in the bending area.

On the contrary, the carbon fiber product of one embodiment of the present invention can be dissolved in a solvent if the molecular weight is reduced by decreasing the number of stacked hexagonal carbon layers. Therefore, the carbon fiber product excels in flatness of the circuit pattern and eliminates a problem in which the circuit pattern breaks due to a stress applied repeatedly.

The carbon fiber product may be suitably used as a material for conductive ink or conductive paints in the same manner as in the case of using carbon black. Since the carbon fiber product is more minute than carbon black, the carbon fiber product exhibits good dispersibility in various types of vehicles. Moreover, the functional groups containing oxygen, with which the exposed edges of the hexagonal carbon layers, are modified increase glossiness of ink and paints. Furthermore, coloring characteristics can be increased.

Furthermore, a conductive adhesive can be obtained by mixing the carbon fiber with an adhesive.

The carbon fiber product may be used in various types of applications such as an anode material of primary and secondary lithium batteries, members of fuel cells (polymer electrolyte membrane, catalyst support, separator, and the like).

Specifically, since the carbon fiber product is not graphitized as described above, the carbon fiber product may effectively be used as an anode material or an additive to the anode material of a lithium ion battery.

Conventionally, graphite materials have been used as the anode material of the lithium ion battery. However, when lithium ions are doped between layers of the graphite materials, the anode material expands due to an increase in the space between the layers. If the charge and discharge cycles are repeated in such a state, the electrode may be deformed or lithium metal may be deposited, thereby causing capacitance degradation or internal short circuits. Moreover, if the space between layers is expanded and contracted repeatedly, the graphite crystal structure may be damaged, whereby the cycle characteristics may be adversely affected.

On the contrary, the carbon fiber product which is scarcely graphitized has a larger space between the AB planes than the graphite material and shows neither expansion nor deformation between layers after doping with lithium ions, thereby exhibiting extremely excellent cycle characteristics. Moreover, the carbon fiber product has an improved electrical energy density in comparison with the graphite material.

Since the center hole 14 is widely opened on the side of the large ring end 20 and the diameter is small on the side of the other end (small ring end 22), the carbon fiber product may be used as a collecting material for collecting minute substances such as bacteria in the center hole 14, or in various types of filters.

The carbon fiber product may be used as a storing material or water retention material which stores various types of gases or liquids in the hollow portion.

Moreover, since various types of substances are selectively adsorbed on the exposed active edges of the hexagonal carbon layers, the carbon fiber product may be used as an adsorbent or adsorptive filter.

Furthermore, since the carbon fiber product is in the shape of a minute particle, the carbon fiber product excels in dispersibility in resins and exhibit good moldability.

When the carbon fiber product is used as a material for ink or paints, ink or paint excelling in glossiness and coloring characteristics can be provided due to good dispersibility in vehicles.

What is claimed is:

1. A method of producing a stacked cup carbon nanofiber product comprising:
   a step of vapor growing a stacked cup carbon nanofiber comprising a coaxial stacking morphology of truncated conical tubular graphene layers, wherein:
      each of the truncated conical tubular graphene layers includes a hexagonal carbon layer in the shape of a hollow cup not having a bottom;
      each of the truncated conical tubular graphene layers has a large ring end at one end and a small ring end at the other end in an axial direction; and
      at least part of edges of the hexagonal carbon layers is exposed at the large ring ends; and
   a step of removing at least part of a deposited film formed during the vapor growth from the large and small ring ends; and
   a step of dividing the stacked cup carbon nanofiber between the hexagonal carbon layers, said hexagonal carbon layers being bonded to one another only by Van der Waals forces, so as to obtain a stacked cup carbon nanofiber product having a length of from one hexagonal carbon layer to several hundreds of stacked hexagonal carbon layers without crushing the shape of each hexagonal carbon layer;
   wherein the stacked cup carbon nanofiber has a round cross-section.

2. The method of producing a stacked cup carbon nanofiber product as defined in claim 1, wherein the carbon fiber is ground by ball milling.

* * * * *